US008721424B2

(12) United States Patent
Ajiro et al.

(10) Patent No.: US 8,721,424 B2
(45) Date of Patent: May 13, 2014

(54) SLOT MACHINE DISPLAYING COUNT OF SYMBOLS DETERMINING PRIZE AND CONTROL METHOD THEREOF

(75) Inventors: Arata Ajiro, Tokyo (JP); Yoichi Kato, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 892 days.

(21) Appl. No.: 12/414,426

(22) Filed: Mar. 30, 2009

(65) Prior Publication Data

US 2009/0264183 A1 Oct. 22, 2009

Related U.S. Application Data

(60) Provisional application No. 61/046,398, filed on Apr. 18, 2008.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................. 463/20; 463/16; 463/18; 463/25; 463/30; 273/292

(58) Field of Classification Search

USPC .................... 463/18, 20, 25, 30, 16; 273/143

See application file for complete search history.

(56) References Cited

U.S. PATENT DOCUMENTS

| | | | | |
|---|---|---|---|---|
| 4,700,948 | A * | 10/1987 | Okada | 273/143 R |
| 6,012,983 | A | 1/2000 | Walker et al. | |
| 6,093,102 | A | 7/2000 | Bennett | |
| 6,960,133 | B1 * | 11/2005 | Marks et al. | 463/20 |
| 2001/0024971 | A1 * | 9/2001 | Brossard | 463/30 |
| 2002/0042294 | A1 * | 4/2002 | Pau et al. | 463/16 |
| 2002/0065124 | A1 | 5/2002 | Ainsworth | |
| 2004/0058727 | A1 * | 3/2004 | Marks et al. | 463/20 |
| 2009/0215517 | A1 * | 8/2009 | Inamura | 463/20 |

* cited by examiner

*Primary Examiner* — Adetokunbo O Torimiro

(74) *Attorney, Agent, or Firm* — Sheppard, Mullin, Richter & Hampton LLP

(57) ABSTRACT

A slot machine comprising a display and a controller programmed to execute processing of: (A) variably displaying a plurality of symbols on the display, and then stop-displaying the symbols; (B) determining a prize based on the number of the symbols of each type stop-displayed on the display; (C) determining, when a plurality of prizes are determined in the processing (B), a priority order among the prizes; and (D) displaying sequence numbers on each of the symbols of the type corresponding to the prize determined in the processing (B), in descending order of the priority order determined in the processing (C).

10 Claims, 17 Drawing Sheets

Fig. 4

| Symbol | Number of rearranged symbols | | | |
|---|---|---|---|---|
| | 2 symbols | 3 symbols | 4 symbols | 5 or more symbols |
| 10 | 2 | 4 | 6 | m× (n−1) (※1) |
| J | 3 | 6 | 9 | |
| Q | 30 | 60 | 90 | |
| K | 10 | 20 | 30 | |
| UMBRELLA | 5 | 10 | 15 | |
| CLOUD | 8 | 16 | 24 | |
| THUNDER | 15 | 30 | 45 | |
| SUN | 25 | 50 | 75 | |
| ·<br>· | ·<br>· | ·<br>· | ·<br>· | ·<br>· |
| BONUS | Free game (※2) | | | |

※1 "m" represents an individual payout amount in case of rearrangement of 3 symbols.
"n" represents the number of rearranged symbols.

※2 Free games are executed in case of rearrangement of 3 or more symbols.

SLOT MACHINE DISPLAYING COUNT OF SYMBOLS DETERMINING PRIZE AND CONTROL METHOD THEREOF

CROSS-REFERENCE TO RELATED APPLICATIONS

This application claims benefit of priority based on U.S. Provisional Patent Application No. 61/046,398 filed on Apr. 18, 2008. The contents of this application are incorporated herein by reference in their entirety.

BACKGROUND OF THE INVENTION

1. Field of the Invention

The present invention relates to a slot machine displaying number count of a symbol that determines a prize, and a controlling method thereof.

2. Discussion of the Background

In conventional slot machines, when a player inserts game media such as medals; coins or bills into an insertion slot of the slot machine and presses a spin button, then a plurality of symbols are scroll-displayed to a display portion provided on the front surface of a casing and, thereafter, the respective symbols are automatically stopped, as disclosed in U.S. Pat. Nos. 6,960,133, 6,012,983 and 6,093,102. In this case, when scroll-display of respective symbols starts by an input from the spin button, symbols are selected using random numbers, and the selected symbols are stop-displayed on the display portion. Then, when a combination of the stop-displayed symbols along a winning line is a predetermined winning combination (prize) a payout is conducted.

Further, among conventional slot machines, there are some slot machines which conduct two types of payouts which are a payout determined according to the combinations of symbols rearranged along winning lines and a payout determined according to the number of displayed scatter symbols, as disclosed in U.S. Pat. No. 6,604,999 and US 2002-0065124-A1.

Size of a prize based on scatter symbols is different depending on the number of the displayed scatter symbols. However, there has been a problem that, when the prize based on scatter symbols is offered, the player can hardly recognize on how many displayed scatter symbols the prize is based.

The applicants of this application has invented so far a slot machine in which a plurality of types of scatter symbols are present. However, in the case where a plurality of types of scatter symbols are present, there is a new problem that a player can hardly recognize on what type of scatter symbol the prize is based and what kind of payout is offered.

The present invention was devised in view of the above problem, and thus a purpose of the present invention is to provide a slot machine which displays scatter symbols in a manner a player can easily recognize the number of the scatter symbols, and also allows the player to easily recognize on what type of scatter symbol the prize is based and what kind of payout is offered even when a plurality of types of scatter symbols are present, and a game controlling method of the slot machine.

The contents of U.S. Pat. No. 6,960,133, U.S. Pat. No. 6,012,983, U.S. Pat. No. 6,093,102, U.S. Pat. No. 6,604,999 and U.S. 2002-0065124-A1 are incorporated herein by reference in their entirety.

SUMMARY OF THE INVENTION

The present invention provides a slot machine having the following configuration.

Namely, the slot machine comprises a display, and a controller programmed to execute processing of: (A) variably displaying a plurality of symbols on the display, and then stop-displaying the symbols; (B) determining a prize based on the number of the symbols of each type stop-displayed on the display; (C) determining, when a plurality of prizes are determined in the processing (B), a priority order among the prizes, and (D) displaying sequence numbers on each of the symbols of the type corresponding to the prize determined in the processing (B), in descending order of the priority order determined in the processing (C).

According to the aforementioned slot machine, a prize is determined based on the number of symbols of each type displayed on the display. When a plurality of the prizes are determined, a priority order among the prizes is determined. Thereafter, in descending order of the priority order, sequence numbers are displayed on each of the plurality of symbols of the respective types corresponding to the determined prizes. For example, in, a case where a prize based on display of three "X," type symbols (hereinafter, referred to also as prize "X") and a prize based on display of three "Y" type symbols (hereinafter, referred to also as prize "Y") are determined, a priority order between the prizes is determined. It is to be noted that a method of determining the priority order is not particularly limited, and a determination method based on selection of random numbers may be included. For example, when priority of "1" is determined for the prize "X" and priority of "2" is determined for the prize "Y", in the aforementioned case, each of the three "X" type symbols is firstly replaced with sequence numbers, namely "1", "2", and "3", and then each of the three "Y" type symbols is replaced with sequence numbers, namely "1", "2", and "3". As a result, a player can recognize, at a glance, the number of the displayed symbols on which each of the prizes is based.

Especially, even in the case where plural types of prizes are determined, the slot machine allows the player to easily recognize on what types of scatter symbols the prizes are based and what kinds of payouts are offered.

Further, the present invention provides a slot machine having the following configuration.

Namely, the slot machine comprises a display, and a controller programmed to execute processing of: (A) variably displaying a plurality of symbols on the display, and then stop-displaying the symbols; (B) determining a prize based on the number of the symbols of each type stop-displayed on the display; (C) determining, when a plurality of prizes are determined in the processing (B), a priority order among the prizes based on the payout amount for each of the prizes, and (D) displaying sequence numbers on each of the symbols of the type corresponding to the prize determined in the processing (B), in descending order of the priority order determined in the processing (C).

According to the aforementioned slot machine, a prize is determined based on the number of symbols of each type displayed on the display. When a plurality of the prizes are determined, a priority order among the prizes is determined. Thereafter, in descending order of the priority order, sequence numbers are displayed on each of the plurality of symbols of the respective types corresponding to the determined prizes. For example, in a case where a prize based on display of three "X" type symbols (hereinafter, referred to also as prize "X") and a prize based on display of three "Y" type symbols (hereinafter, referred to also as prize "Y") are determined, a priority order is determined between the prizes.

In this process, the priority order between the prizes is determined based on the payout amount of each of the prizes. For example, in the above case, when the payout amount for the prize "X," is "10" and the payout amount for the prize "Y," is "5", then the priorities of "1" and "2" are determined for the prize "X", and the prize "Y", respectively. Thereafter, sequence numbers are displayed on the symbols of the respective prizes in descending order of the priority order. Specifically, each of the three "X", type symbols is firstly replaced with sequence numbers, namely "1", "2", and "3," and then each of the three "Y" type symbols is replaced with sequence numbers, namely "1", "2", and "3". As a result, a player can recognize, at a glance, the number of the displayed symbols on which each of the prizes is based.

Especially, even in the case where plural types of prizes are determined, the slot machine allows the player to easily recognize on what types of scatter symbols the prizes are based and what kinds of payouts are offered.

Moreover, the priority order is determined based on the payout amounts. Therefore, since the priority order is determined in a descending order of the payout amount, it is possible to firstly make a player very pleased by notifying a prize with a large amount of payout, and then further make the player feel as if additional prizes are offered by sequentially notifying prizes with relatively a small amount of payout. On the other hand, when, for example, the priority order is arranged in ascending order of the payout amount, it is possible to gradually enhance the joy of the player.

Moreover, the present invention provides a controlling method of a slot machine having the following configuration.

Namely, the controlling method of a slot machine comprises a step of (A) variably displaying a plurality of symbols on a display, and then stop-displaying the symbols. The aforementioned controlling method of a slot machine further comprises a step of (B) determining a prize based on the number of the symbols of a type stop-displayed on the display. The aforementioned controlling method of a slot machine further comprises a step of (C) determining, when a plurality of prizes are determined in the step (B), a priority order among the prizes. The aforementioned controlling method of a slot machine further comprises a step of (D) displaying sequence numbers on each of the symbols of the type corresponding to the prize determined in the step (B), in descending order of the priority order determined in the step (C).

According to the aforementioned controlling method of a slot machine, a prize is determined based on the number of symbols of each type displayed on the display. When a plurality of the prizes are determined, a priority order among the prizes is determined. Thereafter, in descending order of the priority order, sequence numbers are displayed on each of the plurality of symbols of the respective types corresponding to the determined prizes. For example, in a case where a prize based on display of three "X" type symbols (hereinafter, referred to also as prize "X") and a prize based on display of three "Y" type symbols (hereinafter, referred to also as prize "Y") are determined, a priority order between the prizes is determined. It is to be noted that a method of determining the priority order is not particularly limited, and a determination method based on selection of random numbers may be included. For example, when priority of "1" is determined for the prize "X" and priority of "2" is determined for the prize "Y" in the aforementioned case, each of the three "X" type symbols is firstly replaced with sequence numbers, namely "1", "2", and "3", and then each of the three "Y" type symbols is replaced with sequence numbers, namely "1", "2", and "3". As a result, a player can recognize, at a glance, the number of the displayed symbols on which each of the prizes is based.

Especially, even in the case where plural types of prizes are determined, the player can easily recognize on what types of scatter symbols the prizes are based and what kinds of payouts are offered.

Further, the present invention provides a controlling method of a slot machine having the following configuration.

Namely, the controlling method of a slot machine comprises a step of (A) variably displaying a plurality of symbols on a display, and then stop-displaying the symbols. The aforementioned controlling method of a slot machine further comprises a step of (B) determining a prize based on the number of the symbols of a type stop-displayed on the display. The aforementioned controlling method of a slot machine further comprises a step of (C) determining, when a plurality of prizes are determined in the step (B), a priority order among the prizes based on the payout amount for each of the prizes. The aforementioned controlling method of a slot machine further comprises a step of (D) displaying sequence numbers on each of the symbols of the type corresponding to the prize determined in the step (B), in descending order of the priority order determined in the step (C).

According to the aforementioned controlling method of a slot machine, a prize is determined based on the number of symbols of each type displayed on the display. When a plurality of the prizes are determined, a priority order among the prizes is determined. Thereafter, in descending order of the priority order, sequence numbers are displayed on each of the plurality of symbols of the respective types corresponding to the determined prizes. For example, in a case where a prize based on display of three "X" type symbols (hereinafter, referred to also as prize "X") and a prize based on display of three "Y" type symbols (hereinafter, referred to also as prize "Y") are determined, a priority order is determined between the prizes.

In this process, the priority order between the prizes is determined based on the payout amount of each of the prizes. For example, in the above case, when the payout amount for the prize "X" is "10" and the payout amount for the prize "Y" is "5", then the priorities of "1" and "2" are determined for the prize "X" and the prize "Y", respectively. Thereafter, sequence numbers are displayed on the symbols of the respective prizes in descending order of the priority order. Specifically, each of the three "X" type symbols is firstly replaced with sequence numbers, namely "1", "2", and "3", and then each of the three "Y" type symbols is replaced with sequence numbers, namely "1", "2", and "3". As a result, a player can recognize, at a glance, the number of the displayed symbols on which each of the prizes is based.

Especially, even in the case where plural types of prizes are determined, the player can easily recognize on what types of scatter symbols the prizes are based and what kinds of payouts are offered.

Moreover, the priority order is determined based on the payout amounts. Therefore, since the priority order is determined in a descending order of the payout amount, it is possible to firstly make a player very pleased by notifying a prize with a large amount of payout, and then further make the player feel as if additional prizes are offered by sequentially notifying prizes with relatively a small amount of payout. On the other hand, when, for example, the priority order is arranged in ascending order of the payout amount, it is possible to gradually enhance the joy of the player.

As thus described, the present invention can provide a slot machine and a controlling method of the slot machine, which allow a player to easily recognize the number of scatter symbols on display, and further allow the player to easily recognize on what types of scatter symbols the prize are based and what kinds of payouts are offered, even in the case where a plurality of kinds of scatter symbols are present.

BRIEF DESCRIPTIONS OF DRAWINGS

FIG. 4 is a view illustrating the relationships between the numbers of rearranged symbols and payout amounts.

DESCRIPTION OF THE EMBODIMENTS

First, the following description will discuss an image displayed on a lower image display panel provided in a slot machine according to one embodiment of the present invention.

FIGS. 1A to 1G, FIGS. 2A to 2D, and FIGS. 3A to 3C are exemplary images each showing an image displayed on the lower image display panel.

Figure 1A:
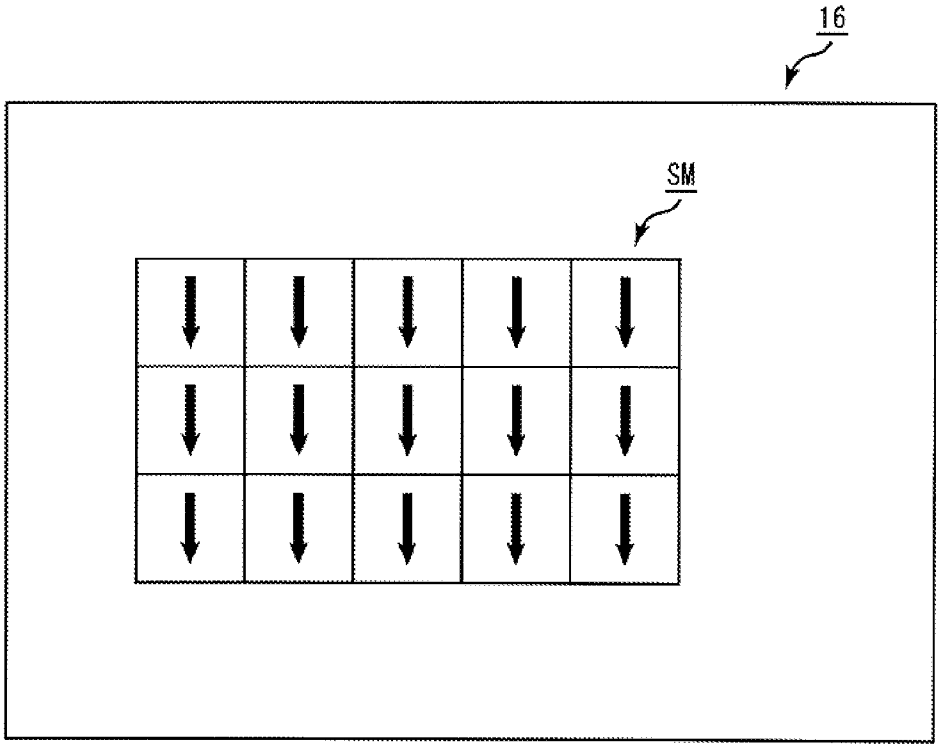
FIG. 1A is a view illustrating an exemplary image which is displayed to a lower image display panel.

On the lower image display panel 16 provided in a slot machine 10 (see FIG. 5), when a predetermined number of coins are bet, and a start button 23 is operated, a plurality of symbols are scroll-displayed in a symbol matrix SM as shown in FIG. 1A. After a predetermined period has elapsed, the symbols are stop-displayed. The following description will discuss a case where the symbols are stop-displayed to be the state shown in FIG. 1D.

In the present embodiment, a prize is determined based on the number of symbols of a same type on display (see FIG. 4). In the case of the state shown in FIG. 1B, three prizes, that is, a prize based on display of four "SUN" symbols, a prize based on display of four "K" symbols, and a prize based on display of two "Q" symbols are established.

Figure 1B:
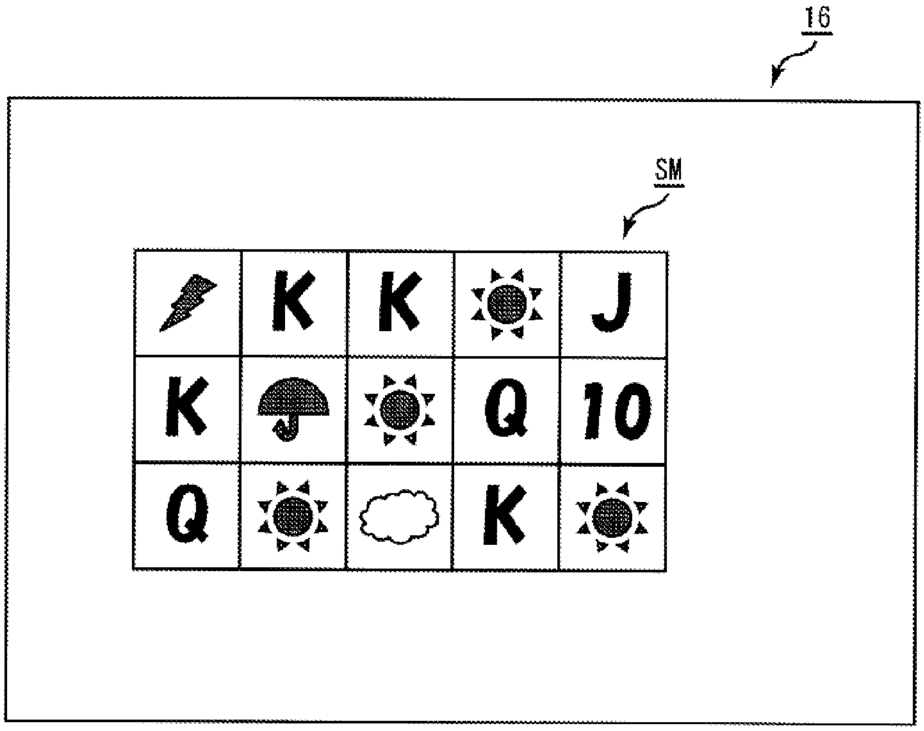
FIG. 1B is a view illustrating an exemplary image which is displayed to a lower image display panel.
Figure 1C:
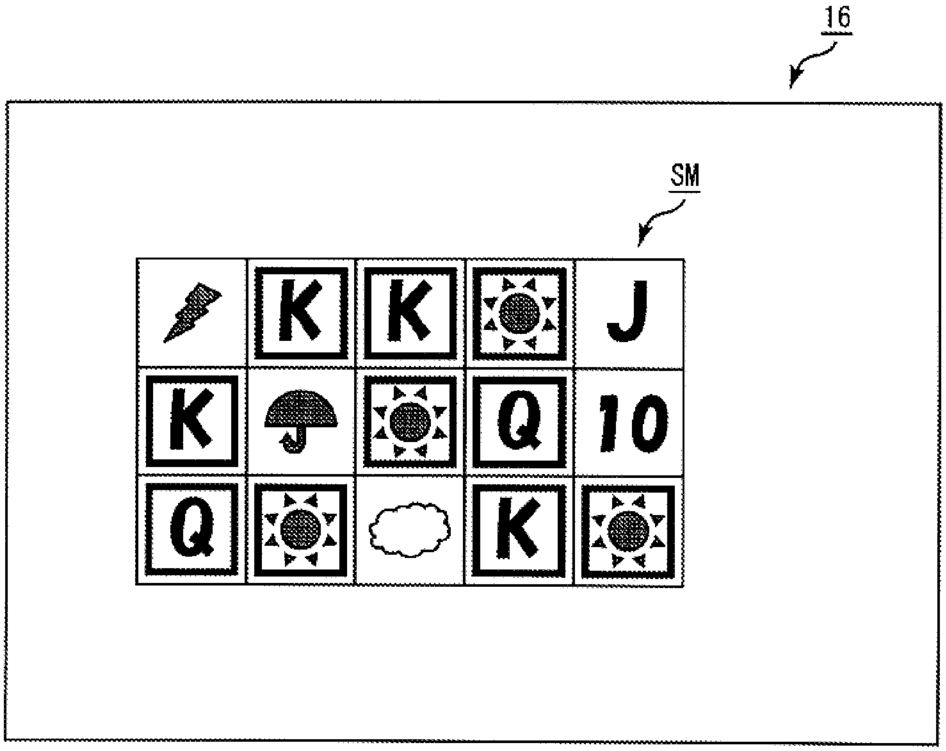
FIG. 1C is a view illustrating an exemplary image which is displayed to a lower image display panel.

After the symbols are stop-displayed in the state as shown in FIG. 1B, the "SUN" symbols, the "K" symbols, and the "Q" symbols, which determine the prizes are rimmed as shown in FIG. 1C. As a result, the player can recognize that the prizes based on display of the "SUN", "K", and "Q" symbols have been established.

Hereinafter, the prize based on display of four "SUN" symbols may also be referred to as 4-"SUN", prize, the prize based on display of four "K" symbols may also be referred to as 4-"K" prize, and the prize based on display of two "Q" symbols may also be referred to as 2-"Q" prize.

In the example shown in FIG. 1B, the payout amount of coins to be offered based on the 4-"SUN" prize is "75" (see FIG. 4). The payout amount of coins to be offered based on the 4-"K" prize is "30" (see FIG. 4), and the payout amount of coins to be offered based on the 2-"Q" prize is "30" (see FIG. 4).

In the present embodiment, a prize for which a larger amount of coin-out is offered is determined to rank higher in the priority order. Moreover, the display processing described below is executed from the prize ranked higher in the priority order.

As for the priority order among prizes with the same payout amount, it is possible to predetermine a priority order among the prizes, or to determine by selection of random numbers on case-by-case basis.

In the present embodiment, previously, the priority of the prize based on the "K" symbols is determined to be higher, when the payout amount for a prize based on "K", symbols and the payout amount for a prize based on the "Q" symbols are the same.

The following description will discuss an example of the case where sequence numbers are displayed in place of the symbols determining each prize, in descending order of the priority order among the prizes.

Figure 1D:
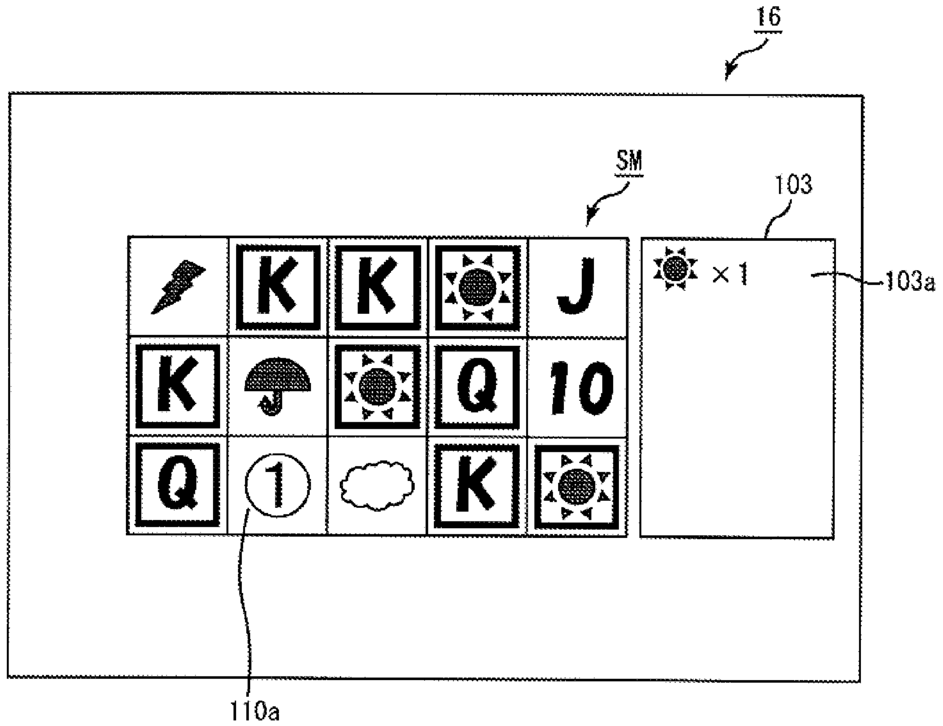
FIG. 1D is a view illustrating an exemplary image which is displayed to a lower image display panel.

After the state shown in FIG. 1C, an image of "1", (sequence number 110*a*) is displayed in place of the "SUN" symbol in the second column from left of the bottom row on the lower image display panel 16 as shown in FIG. 1D. At the same time, an image (image 103*a*) showing count of "SUN" symbols is displayed on a number-of-payouts display portion 103 disposed at the right side of the symbol matrix SM. Here, as the image (image 103*a*) showing the count of "SUN" symbols, an image of "1" is displayed. As described above, the prize based on the "SUN" symbols ranks highest in the priority order.

Figure 1E:
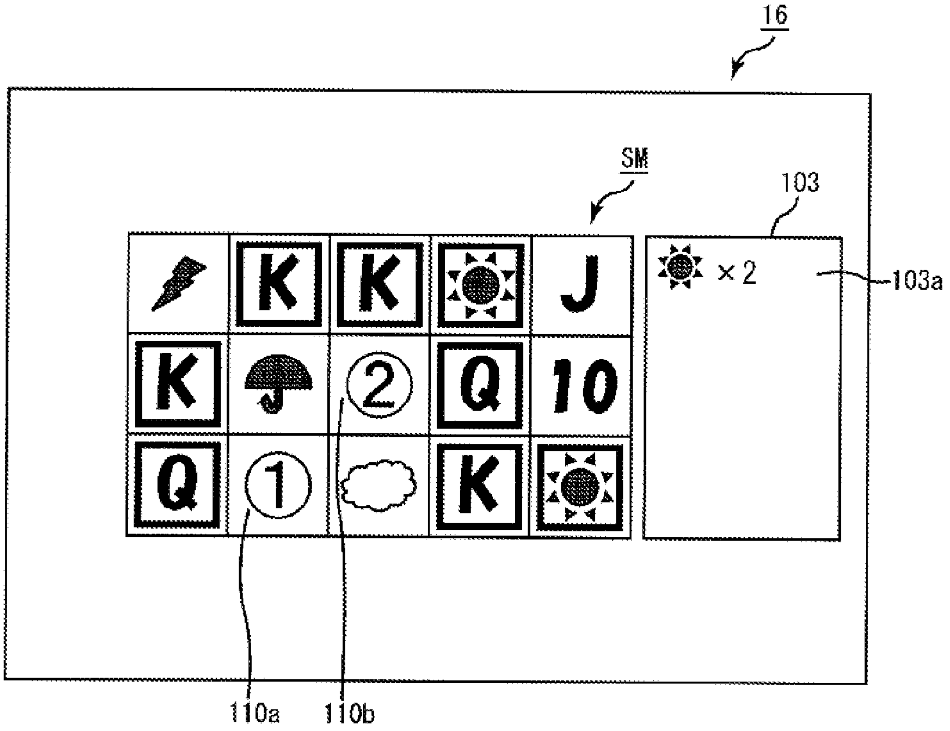
FIG. 1E is a view illustrating an exemplary image which is displayed to a lower image display panel.

After an image shown in FIG. 1D has been displayed, an image of "2" (sequence number 110*b*) is displayed in place of the "SUN" symbol in the third column from left of the middle row on the lower image display panel 16 as shown in FIG. 1E. At the same time, as the image (image 103*a*) showing the count of "SUN" symbols, an image of "2", is displayed on the number-of-payouts display portion 103.

Figure 1F:
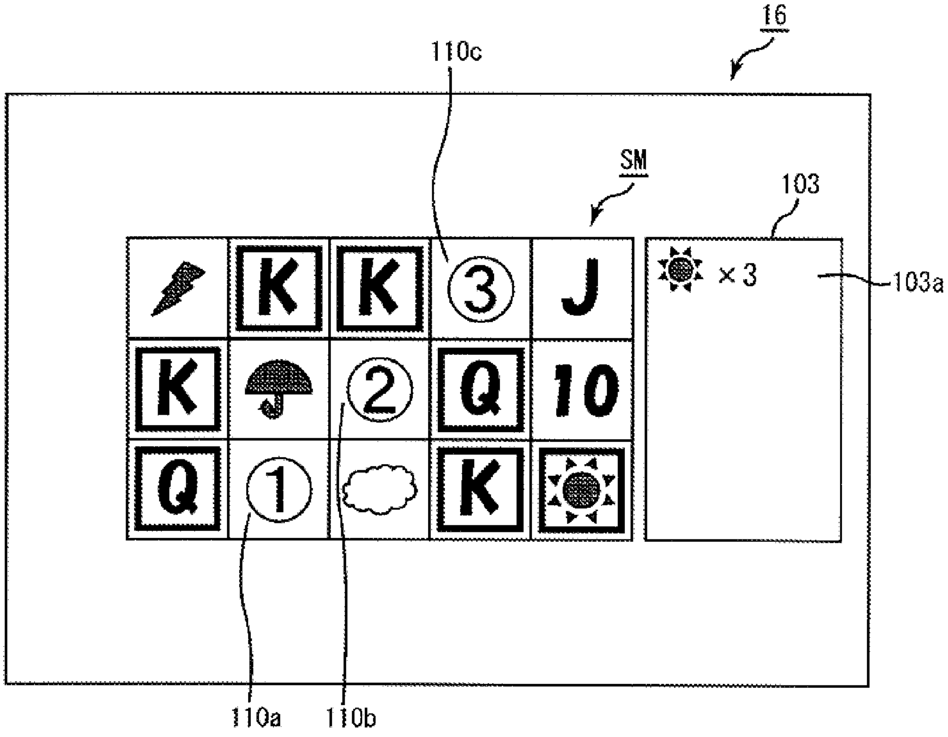
FIG. 1F is a view illustrating an exemplary image which is displayed to a lower image display panel.
Figure 1G:
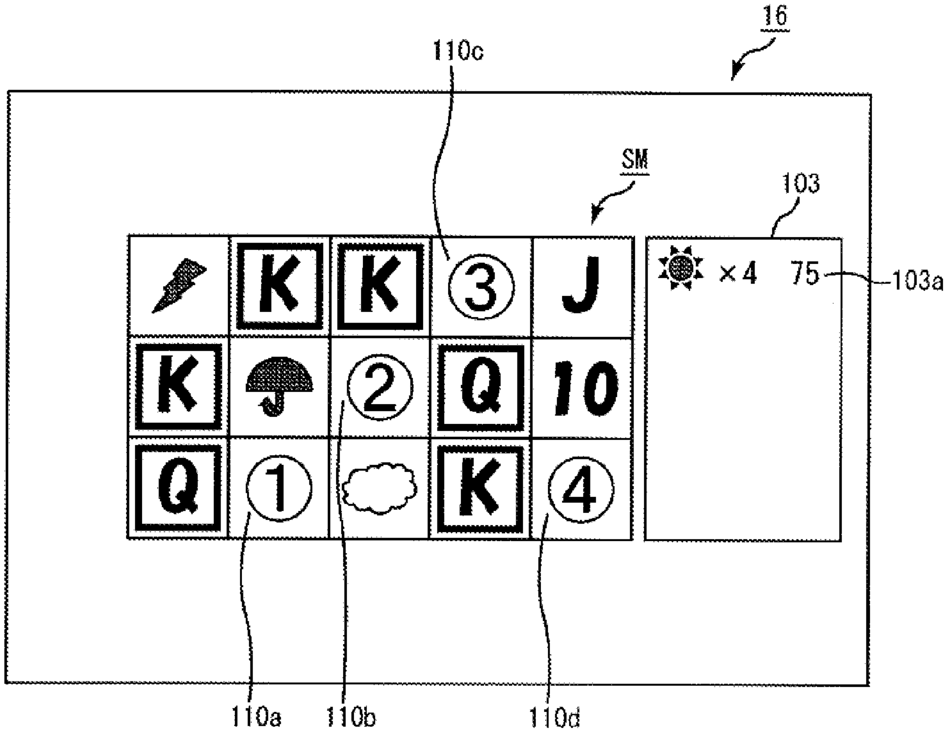
FIG. 1G is a view illustrating an exemplary image which is displayed to a lower image display panel.

Thereafter, in the same manner as described above, sequence numbers are one after the other replaced with the "SUN" symbols in order from left to right (see FIGS. 1F and 1G). At the same time, along with the display of the sequence numbers, the image (image 103*a*) showing the count of the "SUN" symbols displayed on the number-of-payouts display portion 103 is updated.

In the case where more than one of the same symbols are present in one column, replacement with the sequence numbers is performed in order from top to bottom.

After all the "SUN" symbols are replaced with the sequence numbers, the symbols determining the prize of the next highest priority are to be replaced with sequence numbers. It is to be noted that, after all the "SUN" symbols are replaced with the sequence numbers (after the state shown in FIG. 1G), the sequence numbers 110 disappear and then the "SUN" symbols are again displayed in the symbol matrix SM on the lower image display panel 16 (see FIG. 2A).

Figure 2A:
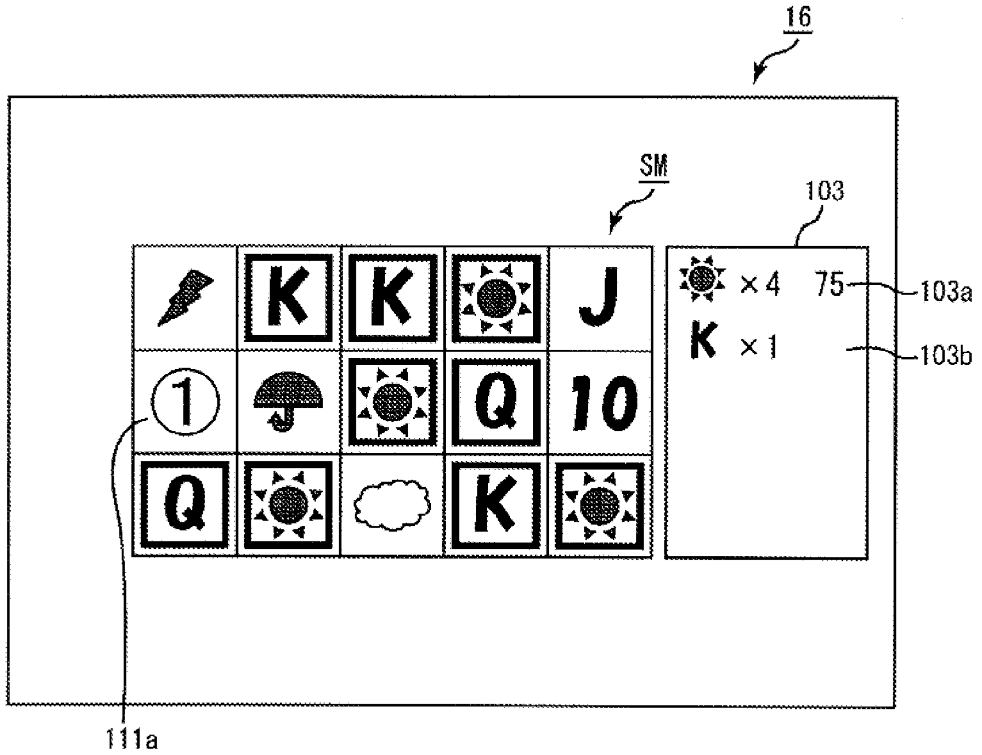
FIG. 2A is a view illustrating an exemplary image which is displayed to a lower image display panel.

After the state shown in FIG. 1G, an image of "1" (sequence number 111*a*) is displayed in place of the "K" symbol in the left most column of the middle row on the lower image display panel 16 as shown in FIG. 2A. At the same time, an image (image 103*b*) showing count of "K" symbols is displayed on the number-of-payouts display portion 103 disposed at the right side of the symbol matrix SM.

Figure 2B:
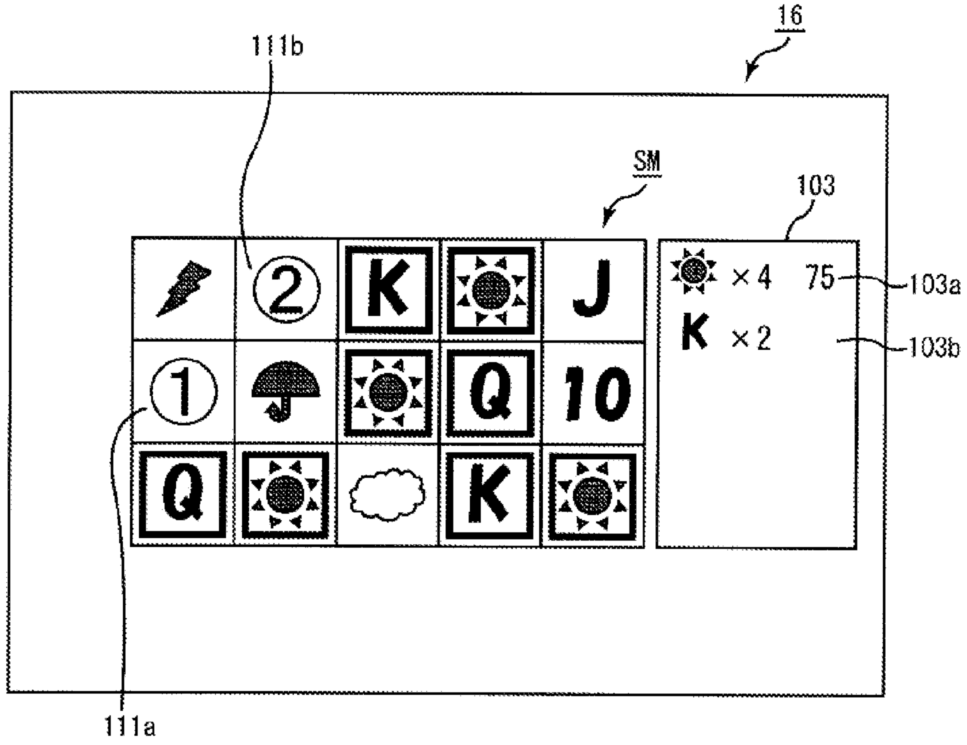
FIG. 2B is a view illustrating an exemplary image which is displayed to a lower image display panel.
Figure 2C:
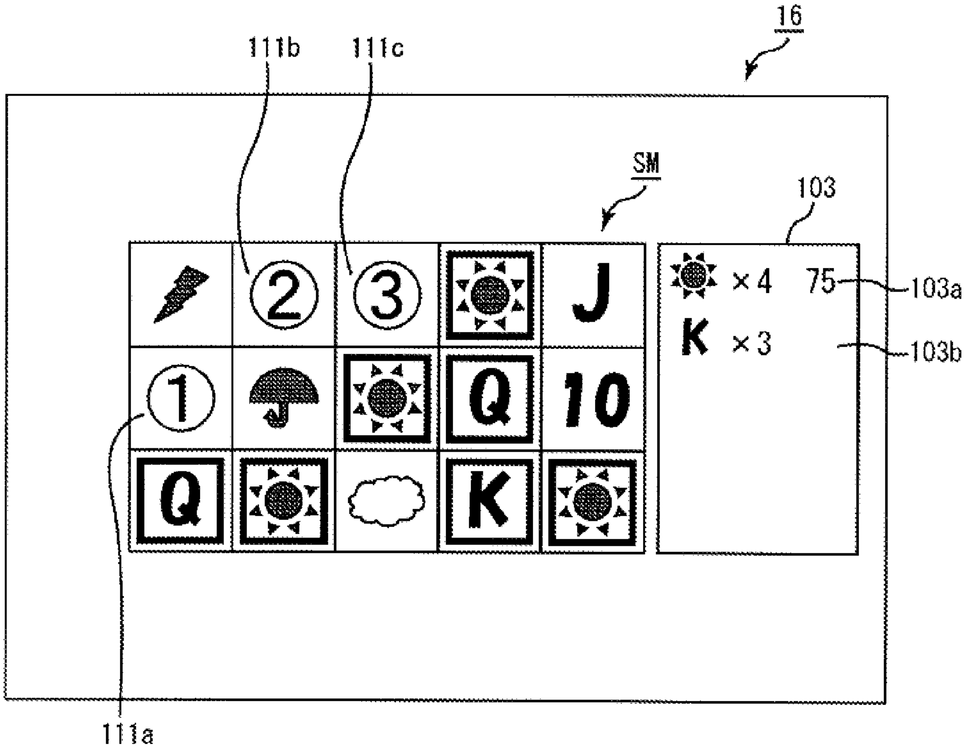
FIG. 2C is a view illustrating an exemplary image which is displayed to a lower image display panel.
Figure 2D:
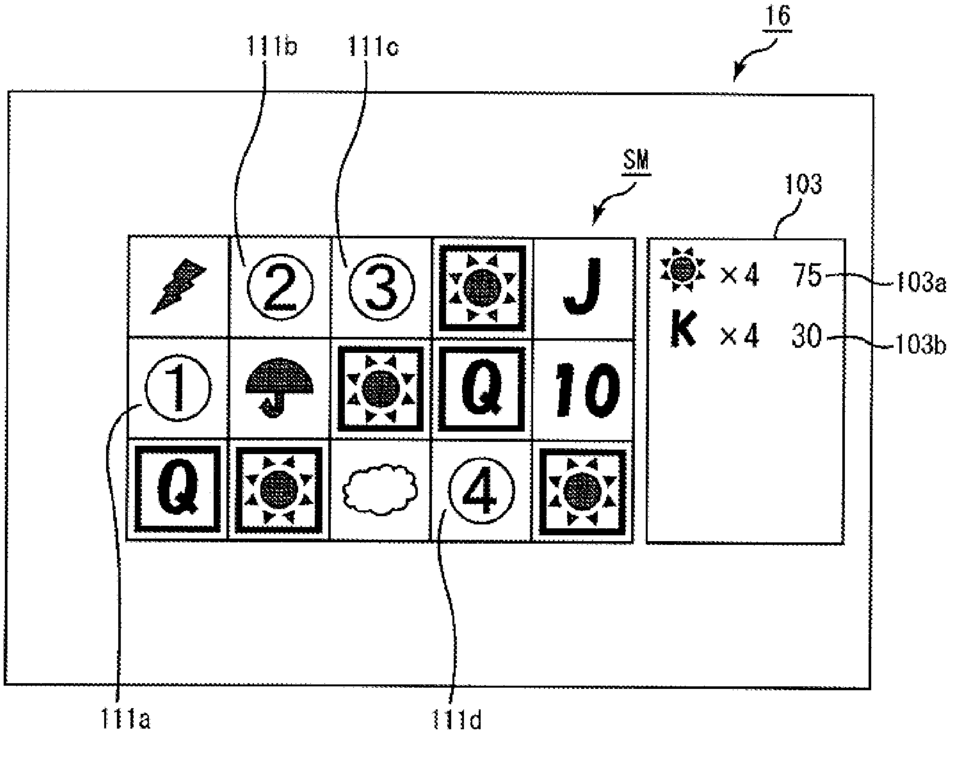
FIG. 2D is a view illustrating an exemplary image which is displayed to a lower image display panel.

Thereafter, in the same manner as described by using FIGS. 1D to 1G, sequence numbers are one after another displayed in place of the "K" symbols (see FIGS. 2B to 2D).

Figure 3A:
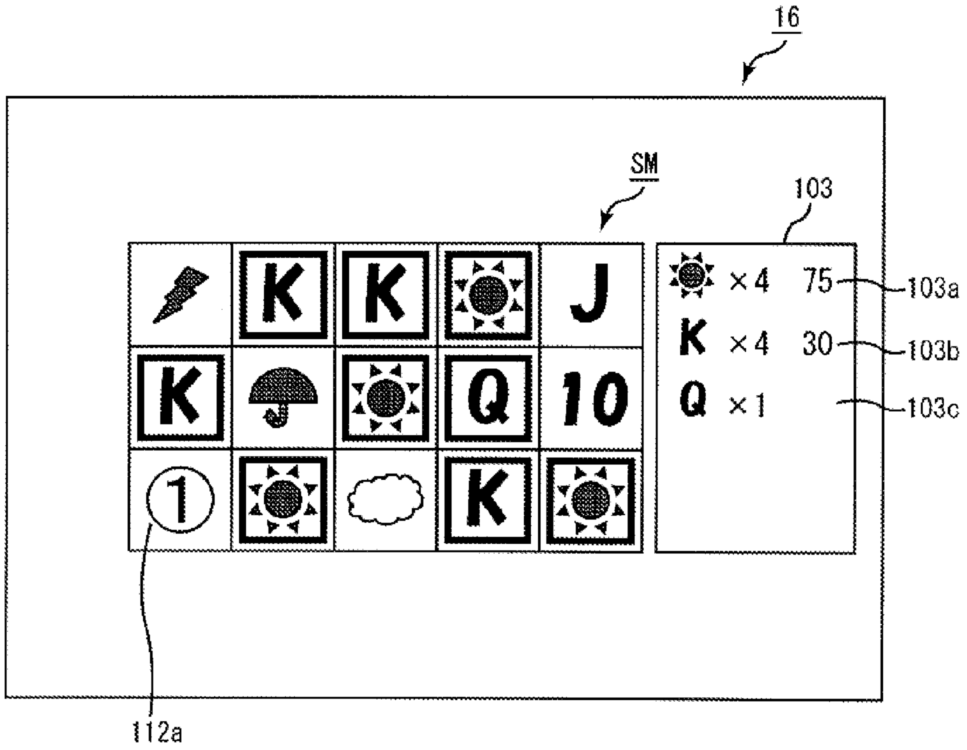
FIG. 3A is a view illustrating an exemplary image which is displayed to a lower image display panel.
Figure 3B:
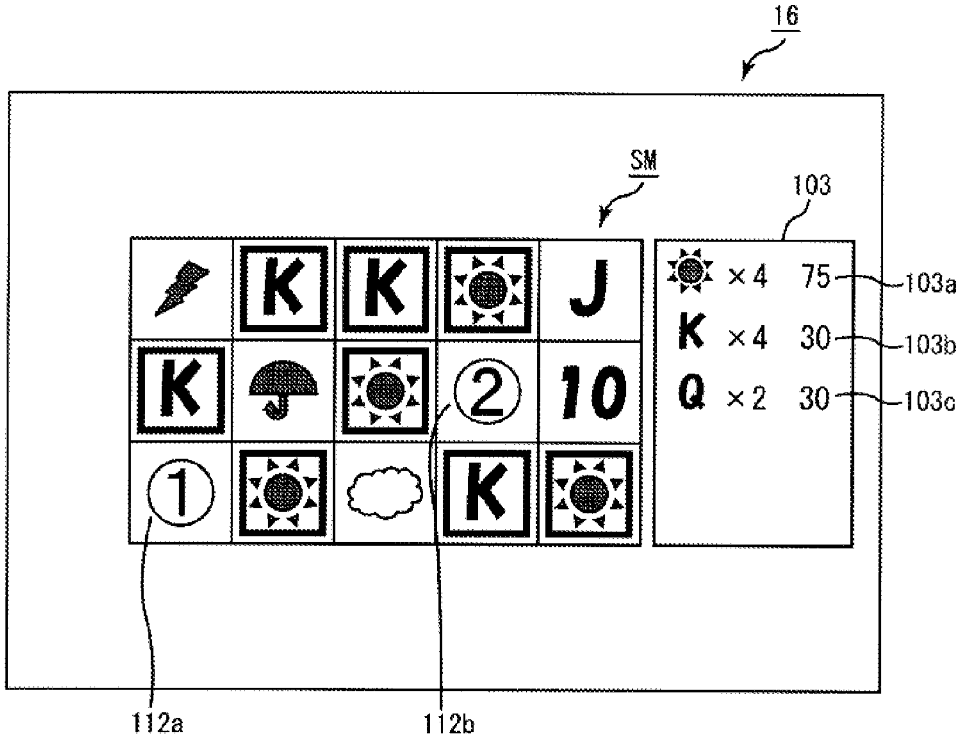
FIG. 3B is a view illustrating an exemplary image which is displayed to a lower image display panel.

After all the "K" symbols are replaced with the sequence numbers, "Q" symbols determining the prize of the next highest priority are replaced with sequence numbers (see FIGS. 3A and 3B).

Figure 3C:
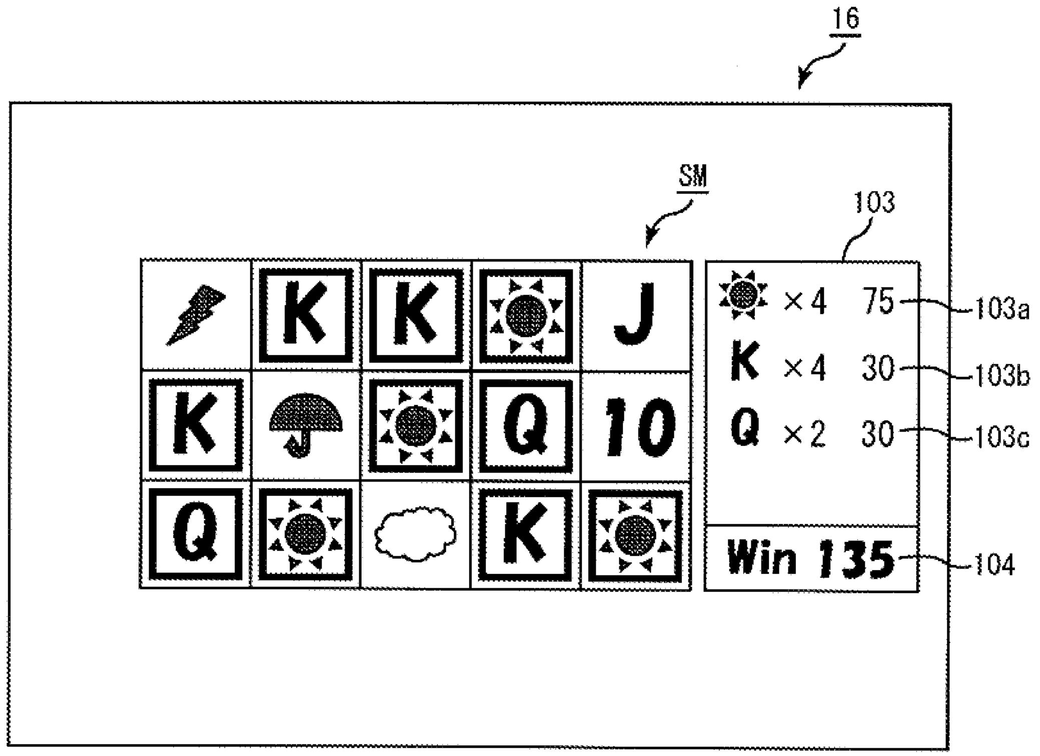
FIG. 3C is a view illustrating an exemplary image which is displayed to a lower image display panel.

After all the "Q" symbols are replaced with the sequence numbers (after the state shown in FIG. 3B), the sequence numbers 112 disappear and then the "Q" symbols are again displayed in the symbol matrix SM on the lower image display panel 16 (see FIG. 3C). At the same time, an image (winning image 104) showing a total number of payouts obtained by summing the number of payouts "75" based on the display of four "SUN" symbols, the number of payouts "30" based on the display of four "K" symbols, and the number of payouts "30" based on the display of two "Q" symbols is displayed on the number-of-payouts display portion 103.

According to the aforementioned slot machine 10, a prize is determined based on the number of symbols of each type displayed on the lower image display panel 16. When a plurality of the prizes are determined, a priority order among the prizes is determined. Thereafter, in descending order of the priority order, sequence numbers are displayed in place of each of the plurality of symbols of the respective types corresponding to the determined prizes. For example, in a case where 4-"SUN" prize and 4-"K" prize are determined, a priority order is determined between the prizes.

In this process, the priority order among the prizes is determined based on the payout amount to be offered for each of the prizes. For example, in the above case, when the payout amount for the 4-"SUN" prize is "75" and the payout amount for the 4-"K" prize is "5", then the priorities of "1" and "2", are determined for the 4-"SUN" prize and the 4-"K" prize, respectively. Thereafter, sequence numbers are displayed in place of the symbols of the respective prizes in descending order of the priority order. Specifically, each of the four "SUN" symbols is firstly replaced with sequence numbers, namely "1", "2", "3", and "4" and then each of the four "K" symbols is replaced with sequence numbers, namely "1", "2", "3", and "4". As a result, a player can recognize, at a glance, the number of the displayed symbols on which each of the prizes is based.

Especially, even in the case where plural types of prizes are determined, the slot machine 10 allows the player to easily recognize on what types of scatter symbols the prizes are based and what kinds of payouts are offered.

Moreover, a higher priority is given to a prize with a larger payout amount. Therefore, it is possible to firstly make a player very pleased by notifying a prize with a large amount of payout, and then further make the player feel as if additional prizes are offered by sequentially notifying prizes with relatively a small amount of payout.

A calculation method of the payout amount will be described by using FIG. 4.

FIG. 4 is a view illustrating the relationships between the numbers of rearranged symbols and payout amounts.

It is to be noted that the payout amounts shown in FIG. 4 are the amounts when the number of BET is 1.

As shown in FIG. 4, the payout amounts are set in association with the types and the number of the rearranged symbols. In FIG. 4, symbols "10", "J", "Q", "K", "UMBRELLA", "CLOUD", "THUNDER", and "SUN" are shown as samples of the symbols. In the present embodiment, all of the symbols are so-called scatter symbols. It is to be noted that the scatter symbol refers to a symbol whose number on display becomes a base to determine the prize.

For example, when three "SUN" symbols are displayed on the lower image display panel 16, the payout amount corresponds to 50 coins. On the other hand, when eight "SUN" symbols are rearranged, the payout amount corresponds to 175 coins based on the formula of "25×(8−1)=175".

The calculation method of the payout amount has been described using the FIG. 4.

The following description will discuss details of the slot machine 10.

Figure 5:
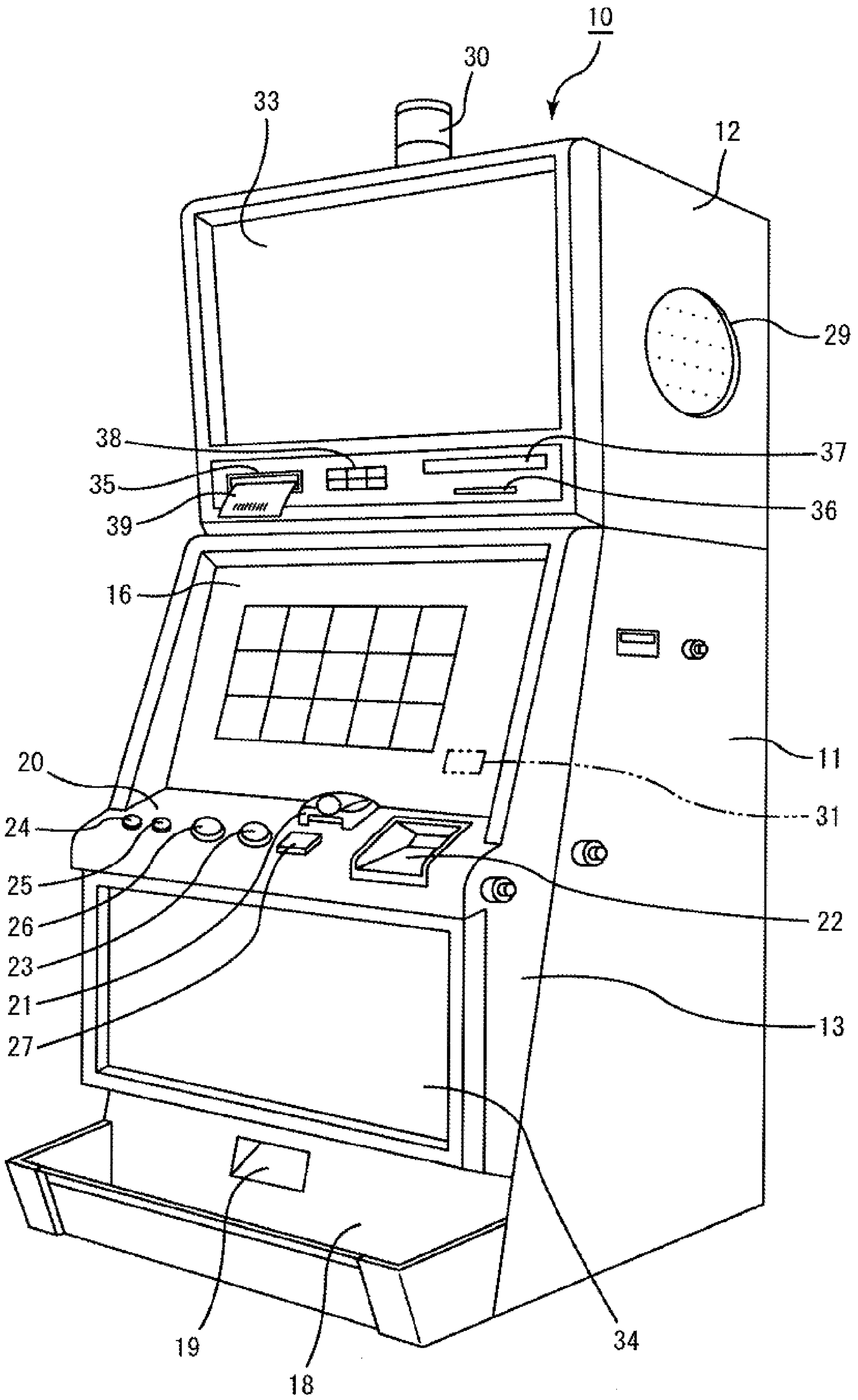
FIG. 5 is a perspective view illustrating an external appearance of a slot machine according to one embodiment of the present invention.

FIG. 5 is a perspective view illustrating the external appearance of the slot machine.

In the slot machine 10, a coin, a bill, or electronic valuable information corresponding thereto is used as a game medium. However, in the present invention, a game medium is not particularly limited. Examples of the game medium may include a medal, a token, electronic money, or a ticket. It should be noted that the ticket is not particularly limited, and examples thereof include a ticket with a bar code, which will be described later.

Here, the slot machine 10 is a standalone type slot machine that is not connected to a network, but the present invention can also be applied to a slot machine connected to a network.

The slot machine 10 includes: a cabinet 11; a top box 12 placed on the upper side of the cabinet 11; and a main door 13 provided at the front face of the cabinet 11. The lower image display panel 16 is provided in front of the main door 13. The lower image display panel 16 includes a liquid crystal display panel which displays the symbol matrix SM (see FIG. 1). The lower image display panel 16 corresponds to the display of the present invention. In the lower image display panel 16, there is provided a number-of-credits display section 31. The number-of-credits display section 31 displays an image indicating the number of credited coins.

Further, a touch panel 69, which is not shown in the figure, is provided on the front face of the lower image display panel 16, and the player can input various kinds of commands by operating the touch panel 69.

Below the lower image display panel 16, there are provided a control panel 20 comprised of a plurality of buttons 23 to 27 with each of which a command according to the game progress is inputted by the player, a coin receiving slot 21 through which a coin is accepted into the cabinet 11, and a bill validator 22.

The control panel 20 is provided with a start button 23, a change button 24, a CASHOUT button 25, a 1-BET button 26, and a maximum BET button 27. The start button 23 is used for inputting a command to start a game. The change button 24 is used for making a request of staff at a recreation facility for exchange. The CASHOUT button 25 is used for inputting a command to pay out credited coins to a coin tray 18.

The 1-BET button 26 is used for inputting a command to BET one coin on a game out of credited coins. The maximum BET button 27 is used for inputting a command to BET the maximum number (10 in the present embodiment) of coins that can be bet on a single game out of credited coins.

The bill validator 22 not only discriminates a regular bill from a false bill, but also accepts the regular bill into the cabinet 11. It should be noted that the bill validator 22 may be configured so as to be capable of reading a later-described ticket 39 with a barcode. At the lower front face of the main door 13, namely below the control panel 20, there is provided a belly glass 34 on which a character or the like of the slot machine 10 is drawn.

At the front face of the top box 12, an upper image display panel 33 is provided. The upper image display panel 33 is provided with a liquid crystal panel to display, for example, an image representing an introduction of the contents of a game or a description of a rule of the game.

Further, the top box 12 is provided with a speaker 29. Below the upper image display panel 33, there are provided a ticket printer 35, a card reader 36, a data display 37, and a keypad 38. The ticket printer 35 prints on a ticket a barcode as coded data of the number of credits, date and time, an identification number of the slot machine 10, and the like, and outputs the ticket as a ticket 39 with a barcode. The player can make another slot machine read the ticket 39 with a barcode to play a game thereon, or can exchange the ticket 39 with a barcode with bills or the like at a predetermined place in the recreation facility (for example, a cashier in a casino).

The card reader 36 reads data from a smart card and writes data into the smart card. The smart card is a card owned by the player, and for example, data for identifying a player and data on a history of games played by the player are stored therein. Data corresponding to a coin, a bill, or a credit may be stored in the smart card. Further, in place of the smart card, a magnetic stripe card may be adopted. The data display 37 is comprised of a fluorescent display or the like, and displays, for example, data read by the card reader 36 or data inputted by the player through the keypad 38. The keypad 38 is used for inputting a command and data concerning the issue of a ticket and the like.

Figure 6:
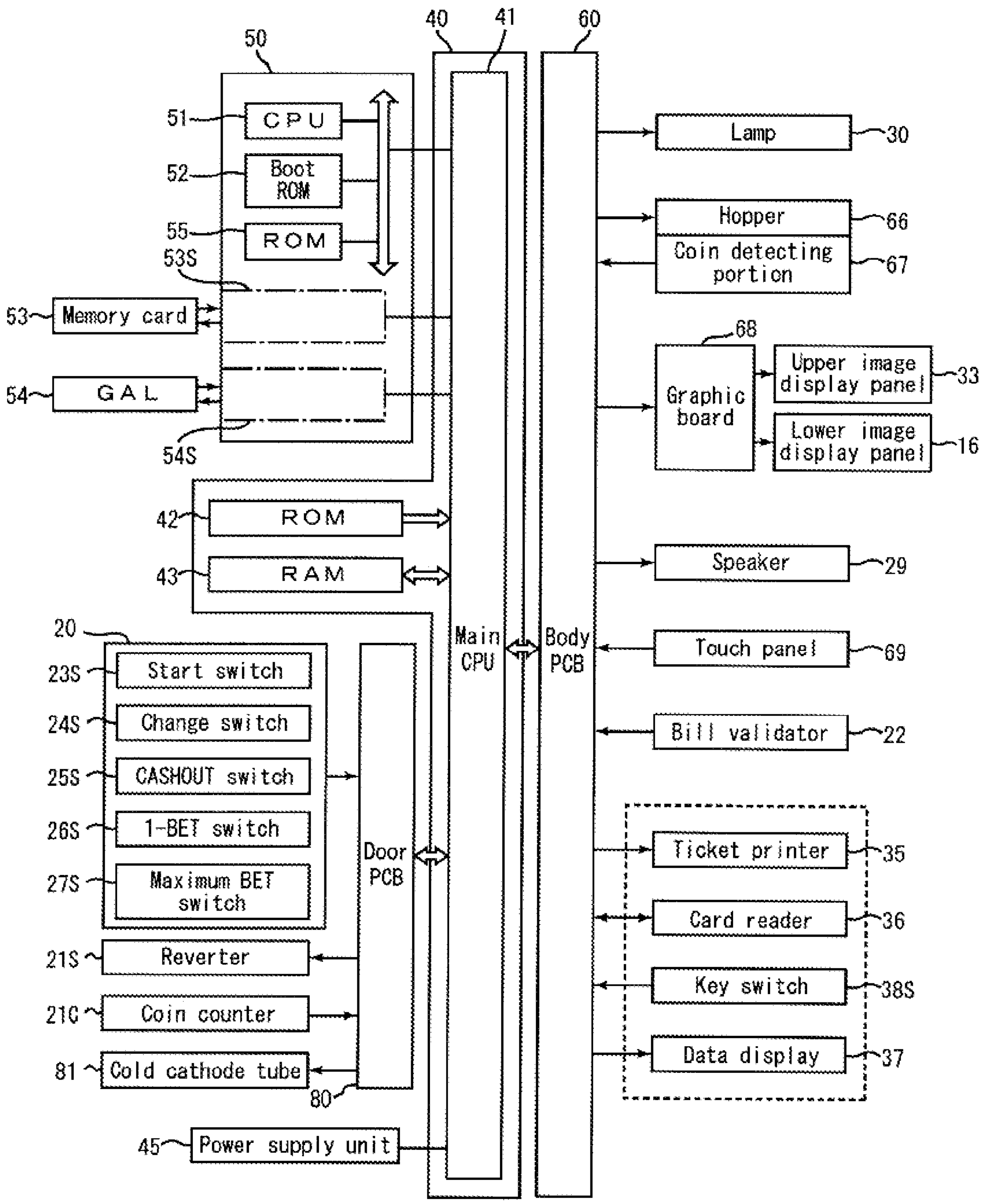
FIG. 6 is a block diagram illustrating an internal configuration of the slot machine illustrated in FIG. 5.

FIG. 6 is a block diagram showing an internal configuration of the slot machine shown in FIG. 5.

A gaming board 50 includes a CPU (Central Processing Unit) 51, a ROM 55, and a boot ROM 52 which are interconnected to one another via an internal bus, a card slot 53S corresponding to a memory card 53, and an IC socket 54S corresponding to a GAL (Generic Array Logic) 54.

The memory card 53 is formed from a nonvolatile memory such as CompactFlash (registered trademark) and stores game programs and game system programs. The game programs include a symbol selection program. The aforementioned symbol selection program is a program for determining the symbols to be rearranged in the symbol matrix SM. The aforementioned symbol selection program includes symbol weighing data in association with plural types of payout ratios (for example, 80%, 84%, 88%). The symbol weighing data is data indicating the correspondence between the respective symbols, and one or more random numbers which fall in a predetermined numerical range (0 to 255). The payout ratios are determined based on payout-ratio setting data outputted from the GAL 54 and, based on the symbol weighing data associated with the payout ratios, the symbols to be rearranged in the symbol matrix SM are determined.

Further, the game programs include table data (see FIG. 4) indicative of the relationships between the numbers of rearranged symbols and the payout amounts.

Further, the card slot 53S is configured so as to allow the memory card 53 to be inserted thereinto or ejected therefrom, and is connected to a mother board 40 via an IDE bus. Thus, the memory card 53 can be ejected from the card slot 53S, and then another game program is written onto the memory card 53, and the memory card 53 can be inserted into the card slot 53S, to change the type and contents of a game to be played on the slot machine 10. The game program includes a program associated with the progress of a game. The game program also includes image data and sound data to be outputted during the game. The image data includes image data and the like indicating a symbol matrix.

The GAL 54 is a type of PLD having a fixed OR array structure. The GAL 54 includes plural input ports and plural output ports and, when predetermined data is inputted to an input port, the GAL 54 outputs data corresponding to the aforementioned data from an output port. The data outputted from this output port is the aforementioned payout-ratio setting data.

Further, the IC socket 54S is configured to allow the GAL 54 to be attached thereto and detached therefrom and is connected to the mother board 40 through a PC bus. Accordingly, the GAL 54 can be replaced with another GAL 54 to change the payout-ratio setting data.

CPU 51, ROM 55 and boot ROM 52 interconnected to one another via an internal bus are connected to the mother board 40 by PCI bus.

The mother board 40 is constructed with a general-purpose mother board commercially available (a printed circuit board on which basic parts of a personal computer are mounted) and includes a main CPU 41, ROM (Read Only Memory) 42 and RAM (Random Access Memory) 43. The mother board 40 is the controller of the present invention.

RON 42 is constituted of a memory device such as a flash memory and stores thereon a program such as BIOS (Basic Input/Output System) executed by the main CPU 41 and permanent data. When BIOS is executed by the main CPU 41, not only is initialization processing for predetermined peripheral devices conducted, but a capture processing for the game program and game system program stored on the memory card 53 is also started via the gaming board 50. In the present invention, contents of RON 42 may be rewritable or not rewritable.

RAM 43 stores data and a program used at the time of operation of the main CPU 41, and various flags. RAM 43 can also store the game program. RAN 43 further stores data on the number of credits, the number of coins-in or coins-out for one game, and the like.

To the mother board 40, a body PCB (Printed Circuit Board) 60 and a door PCB 80, which will be described later, are connected through respective USBs. Further, the mother board 40 is connected with a power supply unit 45.

The body PCB 60 and the door PCB 80 are connected with equipment and devices that generate input signals to be inputted to the main CPU 41, and equipment and devices operations of which are controlled by control signals outputted from the main CPU 41. The main CPU 41 executes a game program stored in the RAM 43 based on an input signal inputted to the main CPU 41, thereby executes the predetermined arithmetic processing and stores a result thereof in the RAM 43, or transmits a control signal to each of the equipment and devices as processing for controlling each of the equipment and devices.

To the body PCB 60, there are connected a lamp 30, a hopper 66, a coin detecting portion 67, a graphic board 68, a speaker 29, a touch panel 69, a bill validator 22, a ticket printer 35, a card reader 36, a key switch 385, and a data display 37. The lamp 30 lights up in a predetermined pattern based on a control signal outputted from the main CPU 41.

The hopper 66 is installed inside the cabinet 11 and pays out a predetermined number of coins from the coin payout exit 19 to the coin tray 18, based on a control signal outputted from the main CPU 41. The coin detecting portion 67 is provided inside the coin payout exit 19, and outputs an input signal to the main CPU 41 when detecting a payout of a predetermined number of coins from the coin payout exit 19.

The graphic board 68 controls, based on a control signal outputted from the main CPU 41, an image display to the upper image display panel 33 and the lower image display panel 16. The number of credits stored in RAM 43 is displayed to the number-of-credits display section 31 of the lower image display panel 16. The number of coins-out is displayed to the number-of-payouts display section 103 (see, for example, FIG. 3) of the lower image display panel 16. The graphic board 68 is equipped with VDP (Video Display Processor) which generates image data based on a control signal outputted from the main CPU 41 and a video RAM which temporarily stores image data generated by VDP, and of the like equipments. It should be noted that image data used in generating image data with VDP is contained in a game program read from the memory card 53 and stored in RAM 43.

The bill validator 22 not only discriminates a regular bill from a false bill, but also accepts the regular bill into the cabinet 11. When accepting a regular bill, the bill validator 22 outputs an input signal to the main CPU 41, based on the face amount of the bill. The main CPU 41 stores, in the RAM 43, the number of credits according to the face amount of the bill transmitted with the input signal.

The ticket printer 35 prints on a ticket, based on a control signal outputted from the main CPU 41, a barcode formed by encoding data such as the number of credits, date and time, an identification number of the slot machine 10, and of the like data stored in the RAM 43, and outputs the ticket as a ticket 39 with a barcode.

The card reader 36 reads data from a smart card and transmits the data to the main CPU 41 or writes data into the smart card based on a control signal from the main CPU 41. The key switch 38S is provided on the keypad 38, and outputs a predetermined input signal to the main CPU 41 when the keypad 38 is operated by the player. The data display 37 displays, based on a control signal outputted from the main CPU 41, data read by the card reader 36 or data inputted by the player through the keypad 38.

To the door PCB 80, there are connected a control panel 20, a reverter 21S, a coin counter 21C, and a cold cathode tube 81. The control panel 20 is provided with a start switch 23S corresponding to the start button 23, a change switch 24S corresponding to the change button 24, a CASHOUT switch 25S corresponding to the CASHOUT button 25, a 1-BET switch 26S corresponding to the 1-BET button 26, and a maximum BET switch 27S corresponding to the maximum BET button 27. Each of the switches 23S to 27S outputs an input signal to the main CPU 41 when each of the buttons 23 to 27 corresponding thereto is operated by the player.

The coin counter 210C is provided inside the coin receiving slot 21 and discriminates a regular coin from a false coin inserted into the coin receiving slot 21 by the player. Coins other than regular coins are discharged from the coin payout exit 19. When the coin counter 21C detects a regular coin, the coin counter 21C outputs an input signal to the main CPU 41.

The reverter 21S operates based on a control signal outputted from the main CPU 41, and distributes a coin identified by the coin counter 21C as a regular coin into a cash box (not shown) or the hopper 66, which are disposed in the slot machine 10. Specifically, when the hopper 66 is filled with coins, a regular coin is distributed into the cash box by the reverter 21S. On the other hand, when the hopper 66 is not filled with coins, the regular coin is distributed into the hopper 66. The cold cathode tube 81 functions as a backlight installed on the rear face side of the lower image display panel 16 and the upper image display panel 33, and lights up based on a control signal to be outputted from the main CPU 41.

Next, processing executed on the slot machine 10 will be described.

The main CPU 41 reads a game program and executes the game program to progress a game.

Figure 7:
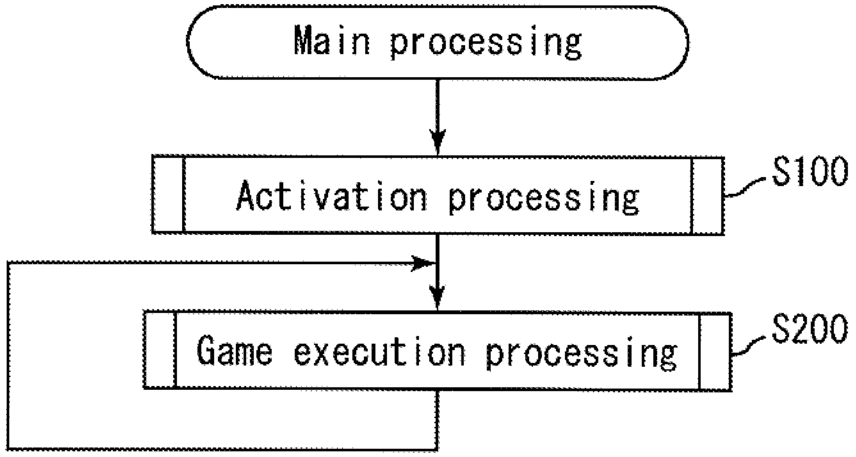
FIG. 7 is a flowchart illustrating a main processing.

FIG. 7 is a flowchart showing a main processing.

In the main processing, first, the main CPU executes an activation processing (step S100). Thereafter, a game execution processing (step S200) is repeated. The activation processing will be described below by using FIG. 11, and the game execution processing will be described below by using FIG. 8.

Figure 8:
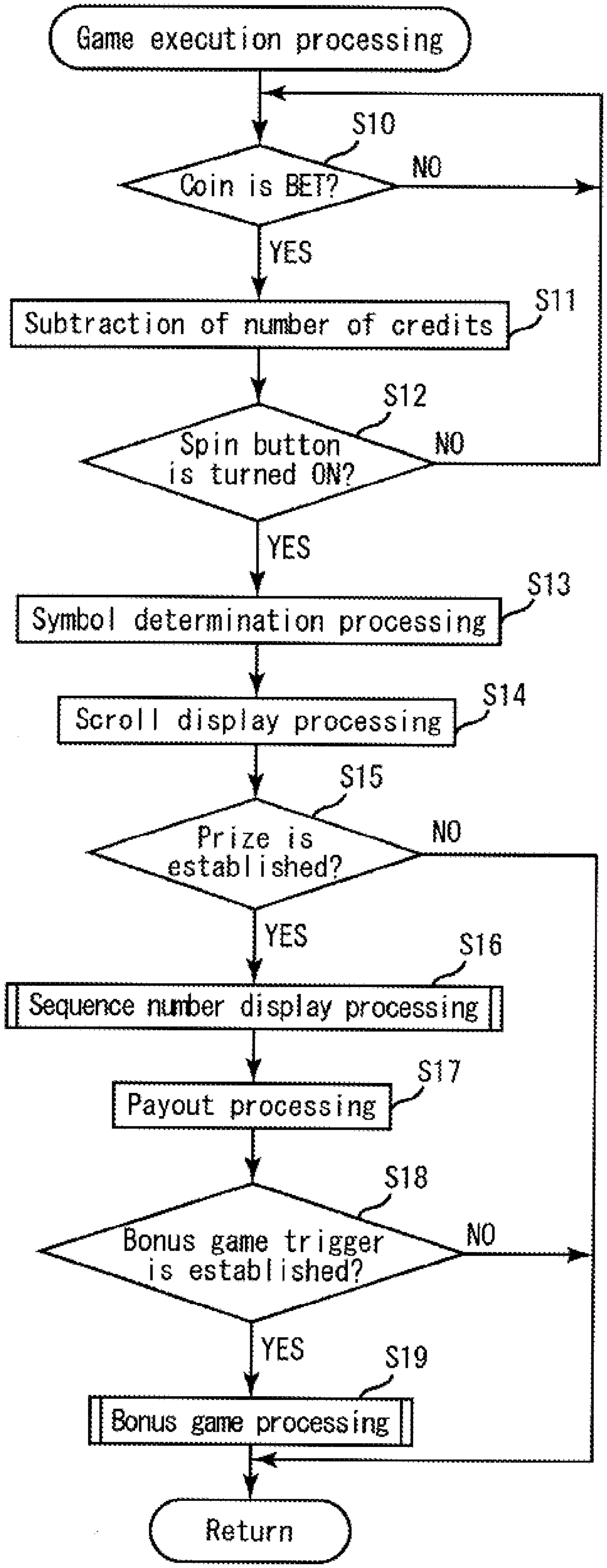
FIG. 8 is a flowchart illustrating a subroutine of a game execution processing.

FIG. 8 is a flowchart showing a subroutine of the game execution processing.

In the game execution processing, first, the main CPU 41 determines whether or not a coin has been BET (step S10). In the processing, the main CPU 41 determines whether or not to have received an input signal outputted from the 1-BET switch 26S when the 1-BET button 26 is operated or an input signal outputted from the maximum BET switch 27S when the maximum BET button 27 is operated. When determining that a coin has not been BET, the main CPU 41 returns the processing to step S10.

On the other hand, when determining that a coin has been BET in step S10, the main CPU 41 executes processing for making a subtraction from the number of credits stored in the RAM 43, according to the number of BET coins (step S11). It should be noted that, when the number of BET coins is larger than the number of credits stored in the RAM 43, the main CPU 41 does not execute the processing for making a subtraction from the number of credits stored in the RAM 43, and returns the processing to step S10. When the number of BET coins exceeds an upper limit of the number of coins that can be BET on a single game (10 in the present embodiment), the main CPU 41 does not execute the processing for making a subtraction from the number of credits stored in the RAM 43, and the processing is proceeded to step S12.

Next, the main CPU 41 determines whether or not the start button 23 has been turned on (step S12). In the processing, the main CPU 41 determines whether or not to have received an input signal outputted from the start switch 23S when the start button 23 is pressed.

When determining that the start button 23 has not been turned ON, the main CPU 41 returns the processing to step S10. It should be noted that, when the start button 23 is not turned ON (for example, when a command to end the game is inputted without pressing the start button 23), the main CPU 41 cancels a result of the subtraction obtained in step S51.

On the other hand, when determining in step S12 that the start button 23 has been turned ON, the main CPU 41 executes symbol determination processing (step S13). In this processing, the main CPU 41 determines symbols to be rearranged in the symbol matrix SM.

Specifically, the main CPU executes a random number generating program included in the gaming program in the RAM 43, and a value is selected from the numerical value range of 0 to 255, thereby the symbols to be rearranged to the symbol matrix SM are determined.

Next, in step 14, the main CPU 41 scroll-displays and stop-displays symbols so that the symbols determined in step S13 are rearranged in the symbol matrix SM.

The main CPU 41 determines whether or not a prize has been established (step S15). When determining that a prize has been established, the main CPU 41 executes sequence number display processing (step S16). The sequence number display processing will be detailed below by using FIG. 9. When determining in step S15 that a prize is not established, the main CPU 41 completes the present subroutine.

After the processing of step S16, the main CPU 41 performs payout of coins corresponding to the number of coin-in and the prize (step S17).

In a case where coins are reserved, the main CPU 41 performs processing to add the coins to the number of credits stored in RAM 43. On the other hand, in a case where payout of a coin is conducted, the main CPU 41 transmits a control signal to the hopper 66 and conducts payout of a predetermined number of coins.

Next, the main CPU 41 determines whether or not a bonus game trigger has been established (step S18). If the main CPU 41 determines that a bonus game trigger has been established, then the main CPU 41 reads, from the RAM 43, a program for performing a bonus game and conducts bonus game processing (step S19). The bonus game processing will be described later in detail, with reference to FIG. 10.

When determining that a bonus game trigger is not established (step S18: NO), or after processing of step S19, the main CPU 41 completes the present subroutine.

Figure 9:
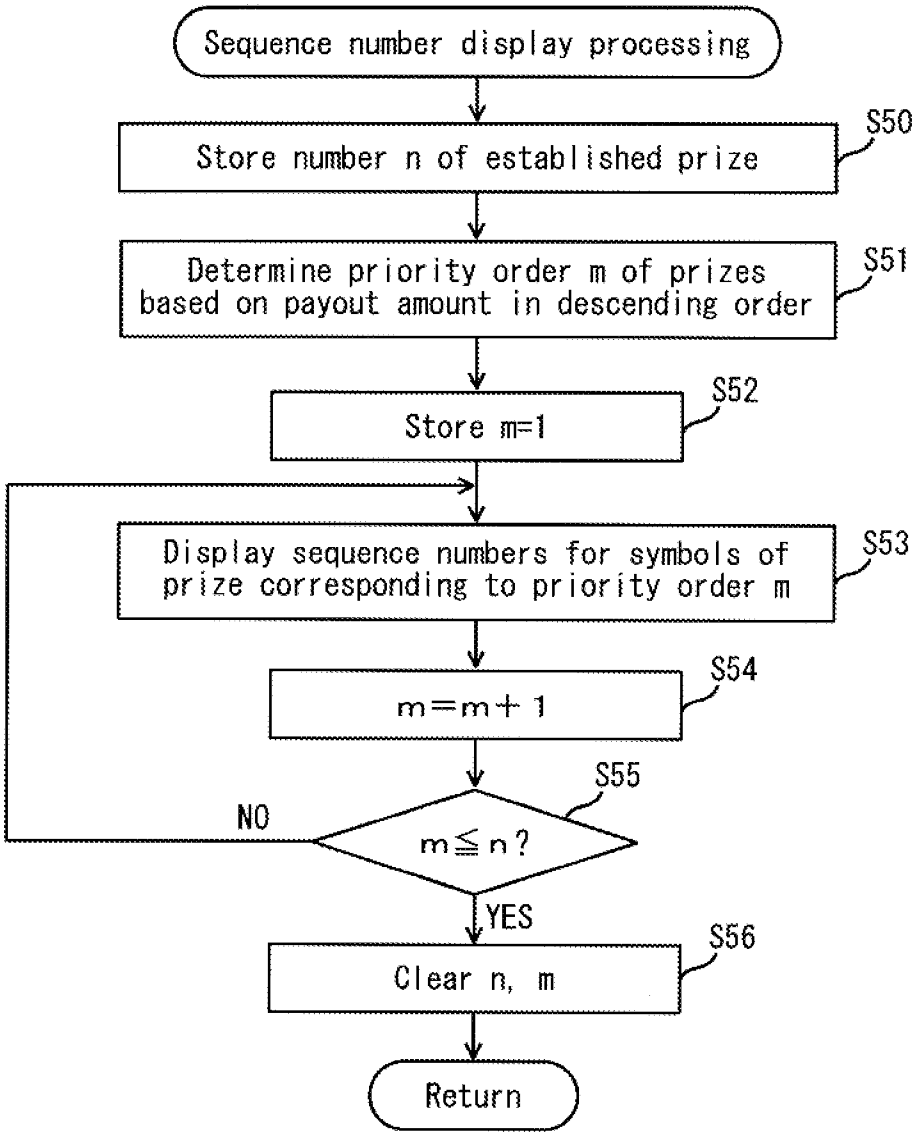
FIG. 9 is a flowchart illustrating a subroutine of a sequence number display processing.

FIG. 9 is a flowchart showing a subroutine of the sequence number display processing.

In the sequence number display processing, first, the main CPU 41 stores number n of the established prizes into the RAM 43 (step S50). In the example shown in FIG. 13, three prizes, namely the prize based on four "SUN" symbols, the prize based on four "K" symbols, and the prize based on two "Q" prizes are established. Thus, the main CPU 41 stores n=3 into the RAM 43.

Next, the main CPU determines a priority order m among the prizes according to the descending order of the payout amount to be offered in each of the prizes. In the example shown in FIG. 1B, the amount of coin-out offered based on the 4-"SUN" prize is "75" (see FIG. 4). The amount of coin-out offered based on the 4-"K" prize is "30" (see FIG. 4). The amount of coin-out offered based on the 2-"Q" prize is "30" (see FIG. 4). Accordingly, the 4-"SUN" prize offering a largest payout amount is determined to rank at the priority m=1 in the priority order. In the present embodiment, when the payout amount based on the "K" symbols and the payout amount based on the "Q" symbols are the same, the prize based on the "K" symbols is determined to rank higher in the priority order. Therefore, the priority m=2 for the 4-"K" prize and the priority m=3 for the 2-"Q" prize are determined, Next, the main CPU 41 stores the m=1 into the RAM 43 (step S52), and then shifts the processing to step S53.

In the step S53, the main CPU 41 displays sequence numbers in place of the symbols of the prize corresponding to the priority m=1. In this processing, when the priority m=1 is stored in the RAM 43, sequence symbols are displayed in place of the symbols of the prize corresponding to the priority m=1. In the example shown in FIG. 1B, sequence numbers are displayed in place of the "SUN" symbols (see FIGS. 1D to 1G).

Next, in step S54, the main CPU 41 adds 1 to the priority m stored in the RAM 43. Thereafter, the main CPU 41 again stores the added priority m into the RAN 43 (step S54).

Next, in step S55, the main CPU 41 determines whether or not the priority m stored in the RAM 43 is not less than the number n of the established prizes. When determining that the priority m stored in the RAM 43 is not less than the number n of the established prizes, the main CPU 41 clears the n and the m stored in the RAM 43 (step S56), and then completes the present subroutine.

On the other hand, when determining in step S55 that the priority m stored in the RAM 43 is less than the number n of the established prizes, the main CPU 41 returns the processing to step S53. As a result, sequence numbers are continuously displayed in place of the symbols of the prize corresponding to the next priority.

Figure 10:
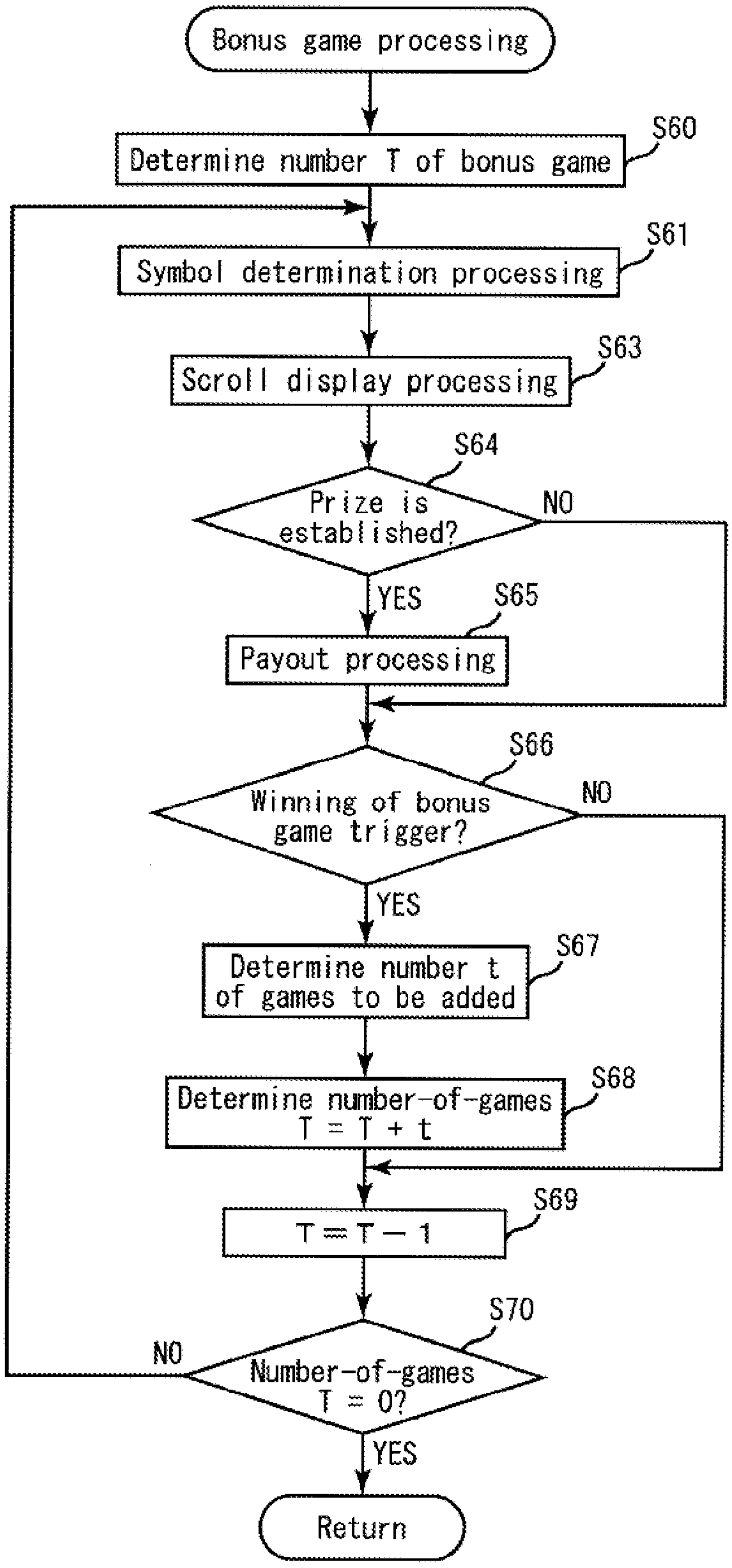
FIG. 10 is a flowchart illustrating a subroutine of a bonus game processing.

FIG. 10 is a flowchart illustrating a subroutine of a bonus game processing.

The bonus game is executed when three or more "BONUS" symbols are displayed. In the bonus game, a predetermined number of times of free game are executed.

In the bonus game processing, first, the main CPU 41 determines a number T of bonus games from 10 to 25 games, based on a random number value obtained by executing a random number generation program included in a game program stored in RAM 43 (step S60). The main CPU 41 stores as data into RAM 43 the number of games of the determined bonus games.

The main CPU then performs symbol determination processing (step S61) and scroll display processing (step S63).

Next, the main CPU 41 determines whether or not a prize is established (step S64). When determining that a prize has been established, the main CPU 41 performs payout of coins according to the number of coin-in and the prize (step S65).

It is to be noted that, although the case is described in which the sequence number display processing is not performed in the free game, the sequence number display processing may be performed during the bonus game (free game) in the period from the determination of establishment of a prize before payout of game media.

In a case where the processing in step S65 has been executed or a prize has not been established in step S64, the main CPU 41 determines whether a bonus game trigger has been established or not (step S66). If it is determined that the bonus game trigger has been established, the number t of additional games of the bonus game is determined in a lottery (step S67) and the determined number t of additional games is added to the number T of games of the bonus game (step S68). Thus, when a bonus game is hit during the bonus game, a remaining number of bonus games increases. More specifically, for example, in a case where a gaming state shifts to 20 bonus games for the first time, and hits 17 bonus games upon conducting 12 of the bonus games, another 25 bonus games (20 bonus games 12 bonus games+17 bonus games) are to be conducted.

In a case where a bonus game trigger has not been established in step S66 or the processing in step S68 has been executed, the main CPU 41 reads the number T of bonus games stored in RAM 43, and one bonus game is subtracted from the read number T of bonus games. The number T of bonus games after the subtraction is again stored into RAM 43 (step S69).

Then, the main CPU 41 determines whether the number T of bonus games reaches the number of games determined in step S60 or not (step S70). More specifically, it is determined whether the number T of games stored in RAM 43 has become 0 or not, and if the number T of games is not 0, that is, if it is determined that the number of bonus games played does not reach the number of games which were determined in step S60, the process returns to step S61 and the above-mentioned processing is repeated. On the other hand, if the number T of games is 0, that is, if it is determined that the number T of games has reached the number of games which were determined in step S60, the main CPU 41 completes the present subroutine.

Figure 11:
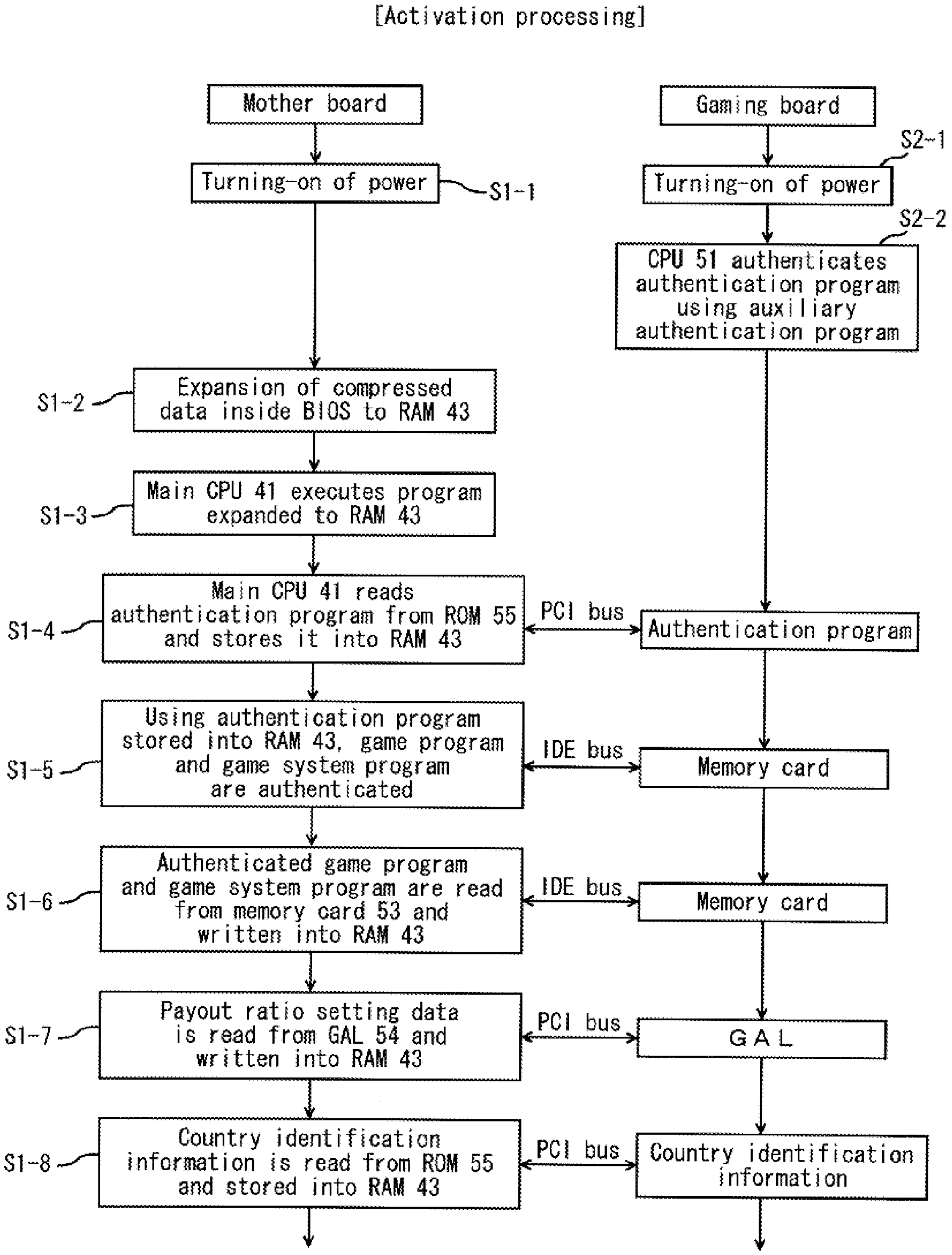
FIG. 11 is a flowchart illustrating a procedure of an activation processing.

FIG. 11 is a flowchart showing a procedure of activation processing. This activation processing is the processing conducted by the mother board 40 and the gaming board 50. It should be noted that the memory card 53 is inserted into the card slot 53S in the gaming board 50, and the GAL 54 is mounted onto an IC socket 54S.

First, when a power switch is turned on (power is turned on) in the power supply unit 451 the mother board 40 and the gaming board 50 are activated (steps S1-1, S2-1). In activation of the mother board 40 and the gaming board 50, respective individual processing is executed in parallel. Namely, in the gaming board 50, the CPU 51 reads the auxiliary authentication program stored in the boot ROM 52, and conducts auxiliary authentication according to the read auxiliary authentication program, to previously check and prove that the authentication program is not falsified before loading the program to the mother board 40 (step S2-2). Meanwhile, in the mother board 40, the main CPU 41 executes the BIOS stored in the ROM 42, and expands compressed data which is incorporated in the BIOS into the R 43 (step S1-2). The main CPU 41 then executes the BIOS expanded into the RAM 43 to diagnose and initialize a variety of peripheral devices (step S5-3).

Since the ROM 55 of the gaming board 50 is connected to the main CPU 41 via the PCI bus, the main CPU 41 reads the authentication program stored in the RON 55, and stores the read authentication program into the RAM 43 (steps S1-4). At this time, according to the standard BIOS function of BIOS, the main CPU 41 takes a checksum by ADDSUM system (normal checking system) and stores the authentication program into the RAM 43, while conducting processing for confirming whether or not the storage is certainly conducted.

Next, after confirming what is connected to the IDE bus, the main CPU 41 accesses, via the IDE bus, the memory card 53 inserted in the card slot 53S, to read a game program or a game system program from the memory card 53. In this case, the main CPU 41 reads data constituting the game program and the game system program by 4 bytes. Subsequently, the main CPU 41 conducts authentication to check and prove that the read game program and game system program have not been falsified, following the authentication program stored in the RAM 43 (step S1-5). When this authentication processing is normally completed, the main CPU 41 writes and stores the game program and the game system program, which have been the authentication targets (which have been authenticated), into the RAM 43 (step S1-6). Next, the main CPU 41 accesses, via the PCI bus, the GAL 54 mounted on the IC socket 54S, reads payout ratio setting data from the GAL 54, and writes and stores the data into the RAN 43 (step S1-7). Subsequently, the main CPU 41 conducts processing for reading country identification information stored in the ROM 55 of the gaming board 50 via the PCI bus, and writes and stores the read country identification information into the RAM 43 (step S1-8).

After conducting the above-mentioned processing, the main CPU 41 reads and executes the game program to execute the processing shown in FIG. 8.

According to the aforementioned slot machine 10 and the control method of the slot machine 10, a prize is determined based on the number of symbols of each type displayed on the lower image display panel 16. When a plurality of the prizes are determined, a priority order among the prizes is determined. Thereafter, in descending order of the priority order, sequence numbers are displayed in place of each of the plurality of symbols of the respective types corresponding to the determined prizes. For example, in a case where 4-"SUN" prize and 4-"K" prize are determined, a priority order is determined between the prizes.

In this process, the priority order among the prizes is determined based on the payout amount to be offered for each of the prizes. For example, in the above case, when the payout amount for the 4-"SUN" prize is "75" and the payout amount for the 4-"K," prize is "5", then the priorities of "1" and "2", are determined for the 4-"SUN" prize and the 4-"K" prize, respectively. Thereafter, sequence numbers are displayed in place of the symbols of the respective prizes in descending order of the priority order. Specifically, each of the four "SUN" symbols is firstly replaced with sequence numbers, namely "1", "2", "3", and "4" and then each of the four "K" symbols is replaced with sequence numbers, namely "1", "2", "3", and "4". As a result, a player can recognize, at a glance, the number of the displayed symbols on which each of the prizes is based.

Especially, even in the case where plural types of prizes are determined, the player can easily recognize on what types of scatter symbols the prizes are based and what kinds of payouts are offered.

Moreover, a higher priority is given to a prize of a larger payout amount. Therefore, it is possible to firstly make a player very pleased by notifying a prize with a large amount of payout, and then further make the player feel as if additional prizes are offered by sequentially notifying prizes with relatively a small amount of payout.

Figure 12:
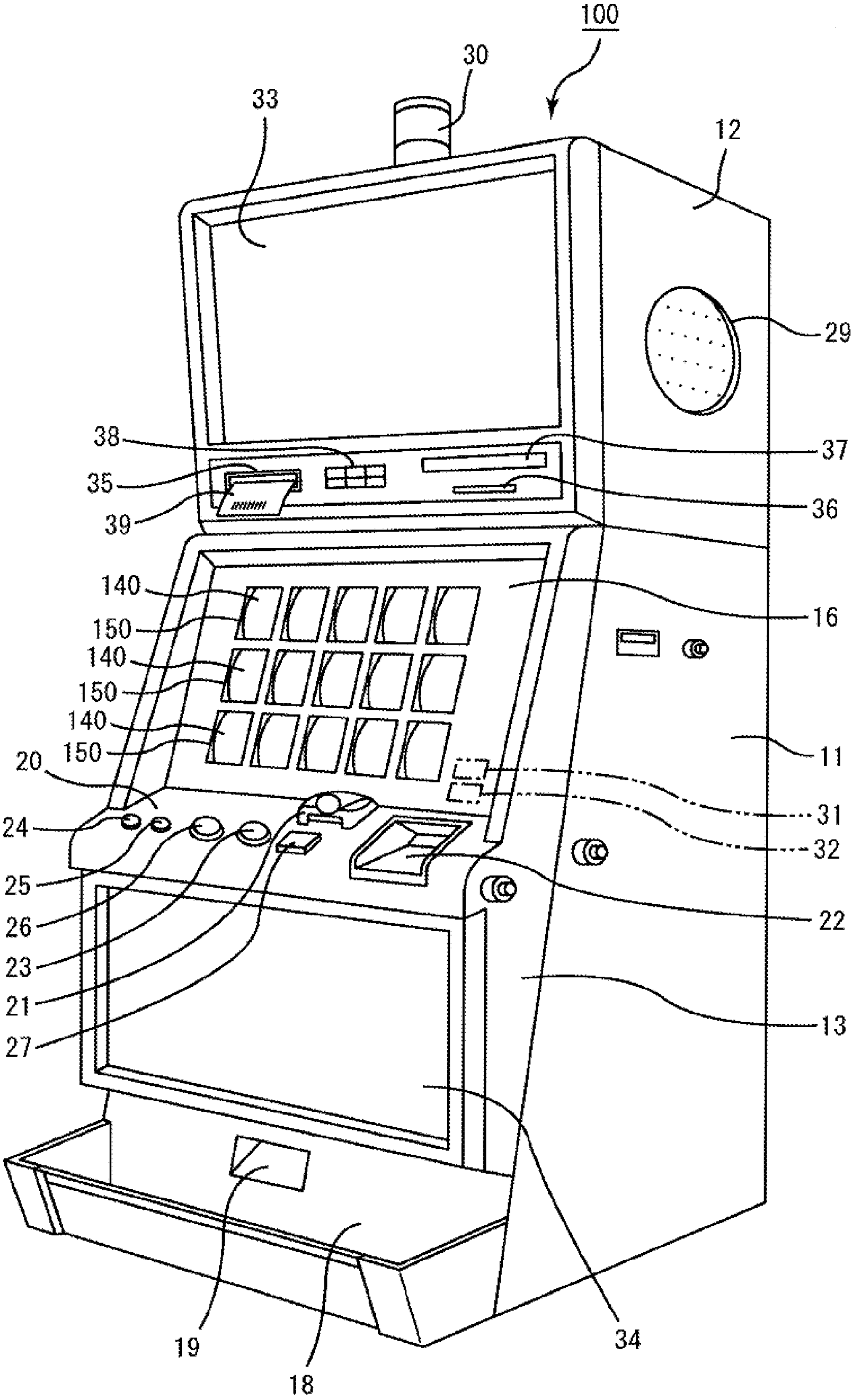
FIG. 12 is a perspective view illustrating an external appearance of a slot machine according to another embodiment.

FIG. 12 is a perspective view illustrating an appearance of a slot machine according to another embodiment of the present invention.

The slot machine 100 has substantially the same appearance, the same circuit structure and the like as those of the slot machine 10, except of the number of reels and, further, the flow chart thereof is also substantially the same as that of the slot machine 10. Therefore, the description thereof will be omitted except the description of the reels. Further, the components corresponding to those of the slot machine 10 will be designated by the same reference characters, in the following description.

Inside of the cabinet 11 of the slot machine 100, 15 reels 140 are rotatably provided along five columns and three rows. On the outer peripheral surface of each of the reels 140, there is drawn a symbol row constituted by four symbols arranged thereon.

In the lower image display panel 16 included in the slot machine 100, there are formed 15 display windows 150 through which a back surface can be seen. One of the symbols drawn on an outer peripheral surface of each of the reels 140 are displayed through the corresponding display windows 150, respectively. In the case of this configuration, a reel control portion including 15 step motors 70, which corresponding to the number of the reels, to control the rotation of the reels may be installed. The slot machine 100 enables stop-displaying symbols of the same type along the same rows, regardless of the order of arrangement of the symbols drawn on the outer peripheral surfaces of the respective reels.

In the aforementioned embodiment, there has been described the case where sequence numbers are displayed by replacing the symbols (symbol images) with the sequence numbers (images of the sequence numbers). However, according to the present invention, mode of displaying the sequence numbers is not limited to the aforementioned example, and may include an embodiment where the sequence numbers are displayed while the symbols are on display. As a method for displaying the sequence numbers while the symbols are on display, there is exemplified a method in which each of the sequence numbers is displayed at a corner of each of the symbols. Moreover, there is also exemplified a method in which translucent images of the sequence numbers are respectively superimposed on the symbols.

Moreover, in the aforementioned embodiment, there has been described the case where the symbols determining a prize are rimmed (see FIG. 1C), and thereafter sequence numbers are displayed in place of the symbols. However, the present invention is not limited to this example, and may include an embodiment where, after symbols are stop-displayed, the symbols determining a prize are rimmed and at the same time the sequence numbers are displayed.

Further, in the aforementioned embodiment, there has been described the case where all the symbols are scatter symbols. However, the present invention is not limited to this example, and may include a symbol (hereinafter, also referred to as normal symbol) which determines a prize when a predetermined combination of the symbols are displayed on a preliminary set winning line. In other words, the slot machine of the present invention may include, as a symbol, both of the scatter symbol and the normal symbol.

In the aforementioned embodiment, there has been described the case in which the sequence numbers are displayed in order, and the display of those sequence numbers are cleared after all of the sequence numbers are displayed. However, the present invention is not limited to this example, and may include an embodiment where one sequence number is displayed at a time by displaying one sequence number and then clearing the sequence number before displaying the next sequence number, in such a manner that, for example, after an image of “1” is displayed, the display of the image of “1” is cleared, and next an image of “2” is displayed and then the display of the image of “2” is cleared. Furthermore, in the present invention, more than one sequence numbers (including all of the numbers) may be simultaneously displayed.

Moreover, in the aforementioned embodiment, there has been described the case where only still images of the sequence numbers are displayed. However, the present invention is not limited to this example, and may include an embodiment where a predetermined moving image is displayed upon display of a sequence number. For example, a moving image of rising smoke may be displayed upon display of a sequence number, or a moving image of a character passing in front of a symbol may be displayed upon display of a sequence number.

In the aforementioned embodiment, there has been described the case in which a higher priority is given to a prize with a larger amount of payout. However, in the present invention, a higher priority may be given to a prize of a smaller amount of payout. In the case of this configuration, it is possible to gradually enhance the joy of the player.

Moreover, in the aforementioned embodiment, there has been described the case in which the priority order among the prizes is determined based on the payout amount of each of the prizes. However, the present invention is not limited to this example, and may include an embodiment where the priority order is determined by selection of random numbers, or an embodiment where the priority order is determined based on a predetermined priority.

Furthermore, in the aforementioned embodiment, there has been described the case in which the sequence numbers displayed in place of one type of symbols determining a prize and the sequence numbers displayed in place of another type of symbols determining a prize are displayed in the same mode. More specifically, in the example described by using FIGS. 1A to 1G, FIGS. 2A to 2D, and FIGS. 3A to 3G, the sequence numbers 110 to be displayed in place of the “SUN” symbols determining the 4-“SUN” prize, the sequence numbers 111 to be displayed in place of the “K” symbols determining the 4-“K” prize, and the sequence numbers 112 to be displayed in place of the “Q” symbols determining the 2-“Q” prize are displayed in the same mode. However, the present invention is not limited to this example, and may include an embodiment where a display mode of sequence numbers is varied depending on prizes, for example, an embodiment where the sequence numbers displayed in place of one type of symbols determining a prize are each surrounded with a circle, and the sequence numbers displayed in place of another type of symbols determining a prize are each surrounded with a triangle.

Although the present invention has been described with reference to embodiments thereof, these embodiments merely illustrate concrete examples, not restrict the present invention. The concrete structures of respective means and the like can be designed and changed as required. Furthermore, there have been merely described most preferable effects of the present invention, as the effects of the present invention, in the embodiments of the present invention. The effects of the present invention are not limited to those described in the embodiments of the present invention.

Further, in the aforementioned detailed description, characteristic portions have been mainly described, for ease of understanding the present invention. The present invention is not limited to the embodiments described in the aforementioned detailed description, but can be also applied to other embodiments over a wider range of applications. Further, the terms and phrases used in the present specification have been used for clearly describing the present invention, not for limiting the interpretation of the present invention. Further, those skilled in the art will easily conceive other structures, systems, methods and the like which are included in the concept of the present invention, from the concept of the present invention described in the present specification. Accordingly, the description of the claims is intended to include equivalent structures that fall within the technical scope of the invention. Further, the abstract aims at enabling engineers and the like who belong to the present technical field but are not familiar with the patent office and public institutions, the patent, law terms and technical terms to immediately understand the technical content and the essence of the present application through brief studies. Accordingly, the abstract is not intended to restrict the scope of the invention which should be evaluated from the description of the claims. It is desirable that literatures and the like which have been already disclosed are sufficiently studied and understood, in order to sufficiently understand the objects of the present invention and the specific effects of the present invention.

In the aforementioned detailed description, there have been described processing to be executed by computers. The aforementioned description and expressions have been described for the sake of enabling those skilled in the art to understand the present invention most effectively. In the present specification, each step for deriving a single result should be understood to be self-consistent processing. Further, each step includes transmission, reception, recording and the like of electric or magnetic signals. Although, in the processing at each step, such signals have been expressed as bits, values, symbols, characters, terms, numerical characters and the like, it should be noticed that they have been merely used for convenience of description. Further, although the processing at each step was described using expressions common to human behaviors in some cases, the processing described in the present specification are to be executed by various types of devices, in principle. Further, other structures required for conducting each step will be apparent from the aforementioned description.

What is claimed as New and Desired to be Secured by Letters Patent of the United States is:

1. A slot machine comprising:
a display, and
a controller programmed to execute processing of:
(A) variably displaying a plurality of symbols on said display, and then stop-displaying the symbols;
(B1) determining a first prize having a payout amount when a predetermined number of symbols of a first type are stop-displayed on said display, wherein the payout amount of the first prize is increased as the number of symbols of the first type is increased, and wherein the symbols of the first type have a first rank;
(B2) determining a second prize having a payout amount when a predetermined number of symbols of a second type are stop-displayed on said display, wherein the payout amount of the second prize is increased as the number of symbols of the second type is increased, and wherein the symbols of the second type have a second rank that is lower than the first rank;
(C) determining, when a plurality of prizes is determined in said processing (B1) and (B2), a priority order among the prizes based on the ranks of the symbols; and
(D) when a priority order among the plurality of prizes is determined in said processing (C), sequentially displaying sequence numbers for the prizes according to the priority order, wherein the sequence numbers are displayed one by one as time elapses at positions on the display where the symbols of the types establishing the prizes have been displayed.

2. The slot machine of claim 1, wherein:
the plurality of symbols is displayed on a plurality of reels on the display; and
the sequence numbers are displayed on a reel-by-reel basis.

3. The slot machine of claim 1, wherein:
the plurality of symbols is displayed on a plurality of reels scrolled in a direction on the display; and
when one of the reels contains a plurality of symbols of the types establishing a plurality of prizes, the sequence numbers are displayed according to the direction in which the reels are scrolled.

4. The slot machine of claim 1, wherein the controller is further programmed to execute processing of:
(E) when the display of sequence numbers for one of the plurality of prizes is completed, displaying the payout amount for that prize.

5. The slot machine of claim 1, wherein the controller is further programmed to execute processing of:
(E) when the display of sequence numbers for all of the plurality of prizes is completed, displaying a total of the payout amounts for the plurality of prizes.

6. A controlling method of a slot machine comprising the steps of:
(A) variably displaying a plurality of symbols on a display, and then stop-displaying the symbols;
(B1) determining a first prize having a payout amount when a predetermined number of symbols of a first type are stop-displayed on said display, wherein the payout amount of the first prize is increased as the number of symbols of the first type is increased, and wherein the symbols of the first type have a first rank;
(B2) determining a second prize having a payout amount when a predetermined number of symbols of a second type are stop-displayed on said display, wherein the payout amount of the second prize is increased as the number of symbols of the second type is increased, and wherein the symbols of the second type have a second rank that is lower than the first rank;
(C) determining, when a plurality of prizes is determined in said processing (B1) and (B2), a priority order among the prizes based on the ranks of the symbols; and
(D) when a priority order among the plurality of prizes is determined in said step (C), sequentially displaying sequence numbers for the prizes according to the priority order, wherein the sequence numbers are displayed one by one as time elapses at positions on the display where the symbols of the types establishing the prizes have been displayed.

7. The controlling method of claim 6, wherein:
the plurality of symbols is displayed on a plurality of reels on the display; and
the sequence numbers are displayed on a reel-by-reel basis.

8. The controlling method of claim 6, wherein:
the plurality of symbols is displayed on a plurality of reels scrolled in a direction on the display; and
when one of the reels contains a plurality of symbols of the types establishing a plurality of prizes, the sequence numbers are displayed according to the direction in which the reels are scrolled.

9. The controlling method of claim 6, further comprising the step of:
(E) when the display of sequence numbers for one of the plurality of prizes is completed, displaying the payout amount for that prize.

10. The controlling method of claim 6, further comprising the step of:
(E) when the display of sequence numbers for all of the plurality of prizes is completed, displaying a total of the payout amounts for the plurality of prizes.

* * * * *